United States Patent [19]

Yokoi

[11] 4,415,153
[45] Nov. 15, 1983

[54] FIGURE DISPLAYING GAME APPARATUS

[75] Inventor: Gunpei Yokoi, Kyoto, Japan

[73] Assignee: Nintendo Co., Ltd., Kyoto, Japan

[21] Appl. No.: 273,954

[22] Filed: Jun. 15, 1981

[30] Foreign Application Priority Data

Jun. 19, 1980 [JP] Japan .................................. 55-83776

[51] Int. Cl.³ ............................................. A63F 9/00
[52] U.S. Cl. ............................... 273/1 GC; 273/85 G
[58] Field of Search ...................... 273/16, 16 A, 16 C, 273/16 E, 1 E, 85 G

[56] References Cited

U.S. PATENT DOCUMENTS 3,583,538  6/1971  Hurley .................................. 273/85
4,249,734  2/1981  Bromley .............................. 273/94
4,306,716 12/1981  James et al. ...................... 273/85 G

FOREIGN PATENT DOCUMENTS 2020077 11/1979 United Kingdom ................ 434/169
2022424 12/1979 United Kingdom .
1568186  5/1980 United Kingdom .
2038600  7/1980 United Kingdom ....... 273/DIG. 28
1590539  6/1981 United Kingdom .

*Primary Examiner*—Vance Y. Hum
*Assistant Examiner*—Leo P. Picard
*Attorney, Agent, or Firm*—W. G. Fasse; D. H. Kane, Jr.

[57] ABSTRACT

An electronic game of a size that may be held in one hand (FIG. 1) has a liquid crystal display screen with activatable display segments forming different display smybols. A player may activate hitting symbol segments in an effort to hit moving symbol segments apparently moving along a plurality of paths. The hitting symbol segments may, for example, display a person trying to hit a moving mole displayed by the moving symbol segments. When a moving symbol is hit score points are accumulated. When a moving symbol is missed it is also recorded and a game is automatically terminated when a permissible number of misses is exceeded. Thereafter, a play may start a new game. Score points and misses are displayed in respective regions of the display screen.

16 Claims, 15 Drawing Figures

FIGURE DISPLAYING GAME APPARATUS

BACKGROUND OF THE INVENTION

1. Field of the Invention

The present invention relates to a figure displaying apparatus. More specifically, the present invention relates to a novel figure displaying game apparatus formed with segments having a configuration for use in a game in a small sized display such as a liquid crystal display.

2. Description of the Prior Art

Conventionally video game machines have become popular as game machines for playing a game by displaying various figures. As well known, a video game machine comprises a cathode-ray tube display so that a variety of figures are displayed on the screen of the cathode-ray tube display in accordance with a program stored in the video game machine. However, in the case of such video game machine, the structure and program for displaying figures for playing a game become complicated and large sized and hence become expensive.

SUMMARY OF THE INVENTION

In brief, the present invention comprises a figure displaying game apparatus which comprises a display apparatus including a plurality of paths each including a plurality of moving symbol segments, a plurality of hitting symbol segments corresponding to the paths, and a plurality of hitting person symbol segments corresponding to the hitting symbol segments. One of the hitting person symbol segments is selected to be displayed through operation by a player. If and when the hitting person symbol segment corresponding to the path where the moving symbol segments are driven for display of apparent movement is driven for display at the timing when the moving symbol segment at the end of the path is driven for display, the hitting symbol segment is driven for display so that the moving symbol may be observed as apparently being hit with the hitting symbol.

According to the present invention, a novel figure displaying game apparatus is provided wherein a game is played for hitting symbols displayed as apparently moving along a plurality of paths with a hitting symbol displayed responsive to operation by a player.

In a preferred embodiment of the present invention, the apparatus is adapted such that the display position of a hitting person symbol is changeable through operation by a player and hitting symbols are provided at the position corresponding to the end of each of the paths and at the position higher than the above described end position so that the hitting symbol may be observed as if the hitting person symbol has raised the hitting symbol when the hitting symbol of the higher position is selectively displayed. Normally the hitting symbol of the higher position corresponding to the hitting person symbol is driven for display and the hitting symbol of the lower position corresponding to the path is driven for display when the display position of the hitting person symbol corresponds to the path where the segment symbol of the end is displayed. As a result, the display looks as if the hitting person symbol hits the moving symbol with the hitting symbol.

In another preferred embodiment of the present invention, the apparatus is adapted such that when a player fails in hitting the moving symbol with the hitting symbol the failure is notified. The apparatus is further adapted such that if and when the number of times of failure reaches a predetermined number the game is terminated. Thus, a predetermined number of hitting failures are allowed in one game, so that the game may be repetitively played within the allowed number of times.

In a further preferred embodiment of the present invention, the apparatus is further adapted such that when a player succeeds in hitting the moving symbol with the hitting symbol by selecting the display position of the hitting person figure so that when the moving symbol at the end of a given path is displayed the hitting symbol corresponding to the said path may be displayed a score point is awarded. As a result, one game can be played to complete for a higher score point.

In still a further preferred embodiment of the present invention, the apparatus is adapted such that at least two different kinds of games may be selected each having a different maximum number of paths for displaying the moving symbols in a plurality of paths, whereby the number of paths for displaying the moving symbols may be different through selection of the kind of games. As a result, a game can be played with different difficulties depending on the level of skill of a player playing the game.

In still another embodiment of the present invention, the apparatus is adapted such that apparent moving display of the moving symbols and the movement of the display position of the hitting person figure responsive to operation of a manual operation switch are performed using a microcomputer or a microprocessor implemented by a large scale integration. As a result, the figure displaying game apparatus can be made small sized and inexpensive.

Accordingly, a principal object of the present invention is to provide a figure displaying game apparatus with which a novel game can be played.

Another object of the present invention is to provide a figure displaying game apparatus that can be implemented with a relatively simple structure and with an inexpensive cost.

A further object of the present invention is to provide a figure displaying game apparatus that can be made small sized.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 7A1, 7A2, 7B1, 7B2 and 7C are flow digrams for explaining the operation of the game mode.

DESCRIPTION OF THE PREFERRED EMBODIMENTS

Figure 1:
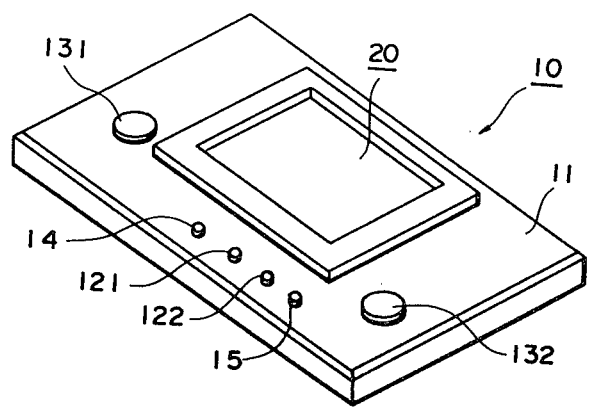
FIG. 1 is a perspective view of a figure display game apparatus of one embodiment of the present invention.

FIG. 1 is a perspective view of one example of a figure displaying game apparatus of one embodiment of the present invention. Referring to the figure, a figure displaying game apparatus 10 comprises a casing 11 for housing various kinds of electronic components. The casing 11 is made in a very small size as small as approximately 61×93×10 mm in length, width and thickness. The casing 11 is provided with a display apparatus 20. The display apparatus 20 preferably employs a liquid crystal display apparatus. Alternatively, the display apparatus may utilize a display apparatus of other types such as electroluminescence, electrochromic, or the like in lieu of a liquid crystal display apparatus, as is needless will say. As to be described subsequently in more detail with reference to FIG. 2, the display apparatus 20 is formed with segments for displaying figures for a game, and a numerical value information displaying portion for displaying the current time or the score of a game. Furthermore, various kinds of switches for commanding a visual display of the figures on the occasion of playing a game and for use in time adjustment of a timepiece are provided in the vicinity of the display apparatus 20 of the casing 11. For example, switches 121 and 122 are start switches for affording a start command of game modes. The start switch 121 is used for commanding a start of a first game mode for playing a game using a visual display of four moles. The start switch 122 is used for commanding a start of a second game mode for playing a game using a visual display of five moles. Operation switches 131 and 132 provided on the left and right sides of the display apparatus 20 are used for commanding movement of the game displaying figures displayed on the display apparatus 20 and, specifically, are used to command movement of hitting person figures to be described subsequently leftward or rightward, for example. A switch 14 is a reset switch for use in time adjustment. A switch 15 is a current time mode switch for displaying the current time on the display apparatus 20.

Moreover, the above described operating switches 131 and 132 are used not only for commanding the movement of the hitting person figures in the game mode but also for commanding quick advancement of the "hour" digit or the "minute" digit on the occasion of the current time setting.

Figure 2:
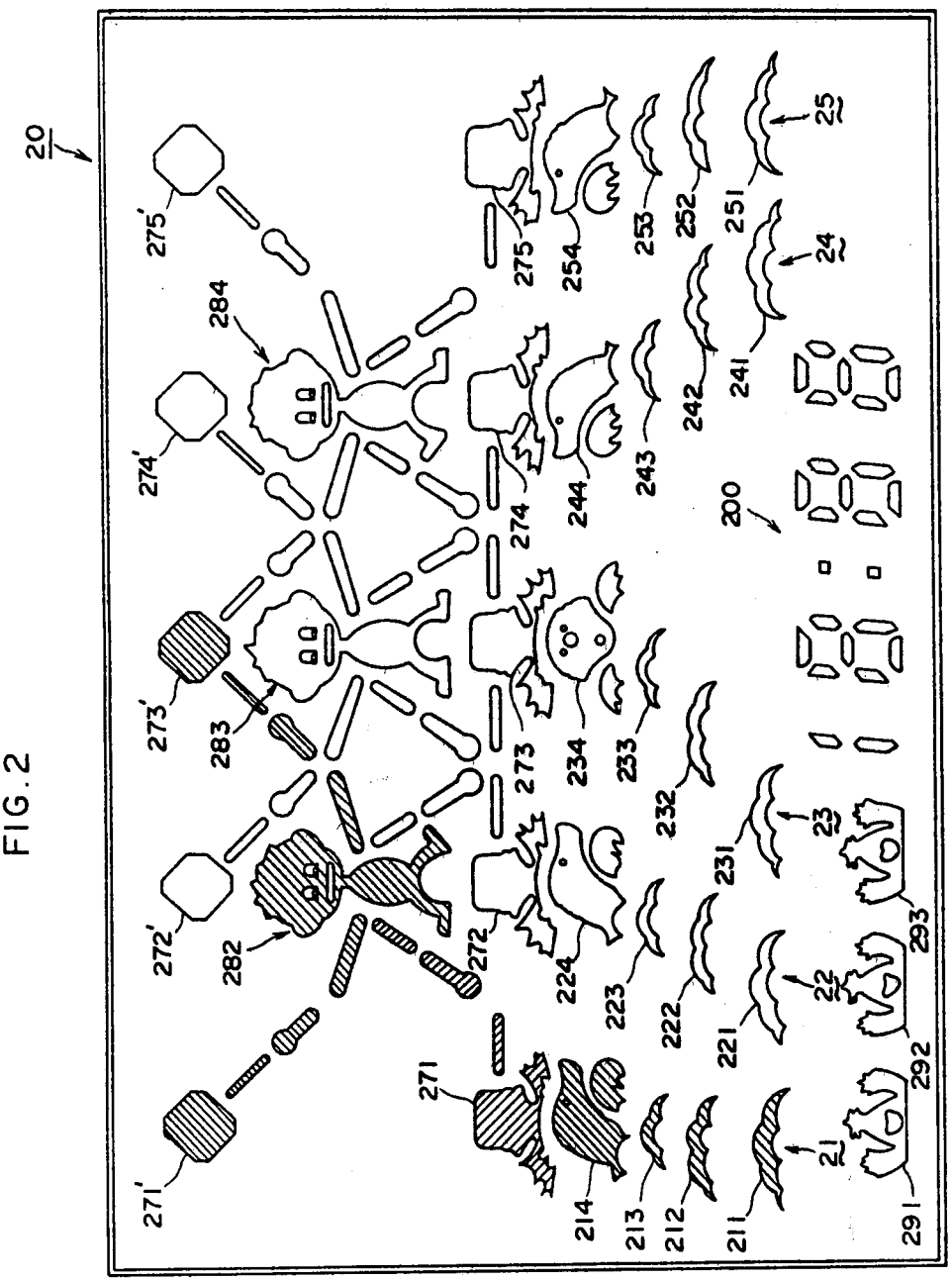
FIG. 2 is a diagrammatic view of a display apparatus.
Figure 3A:
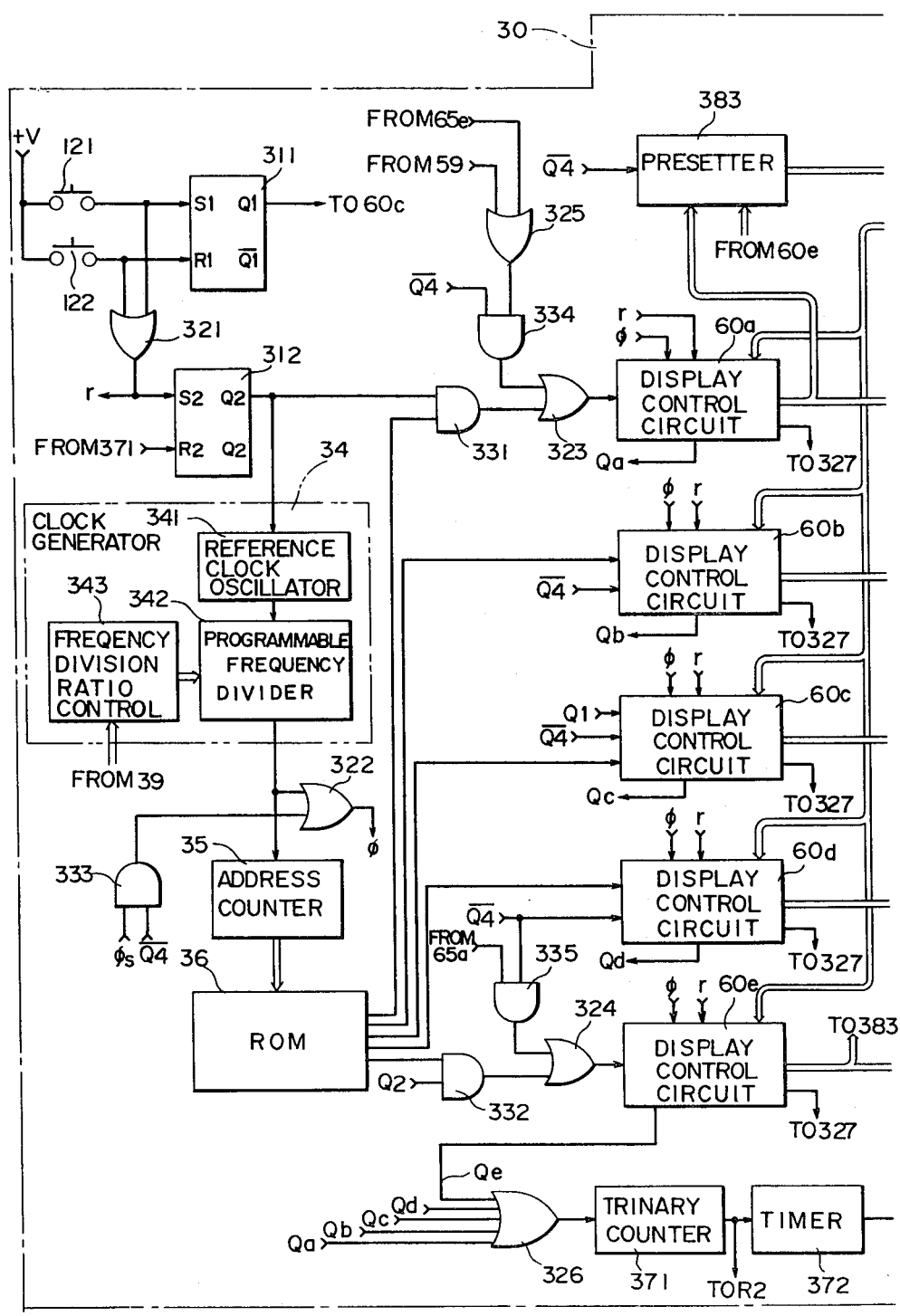
Figure 3B:
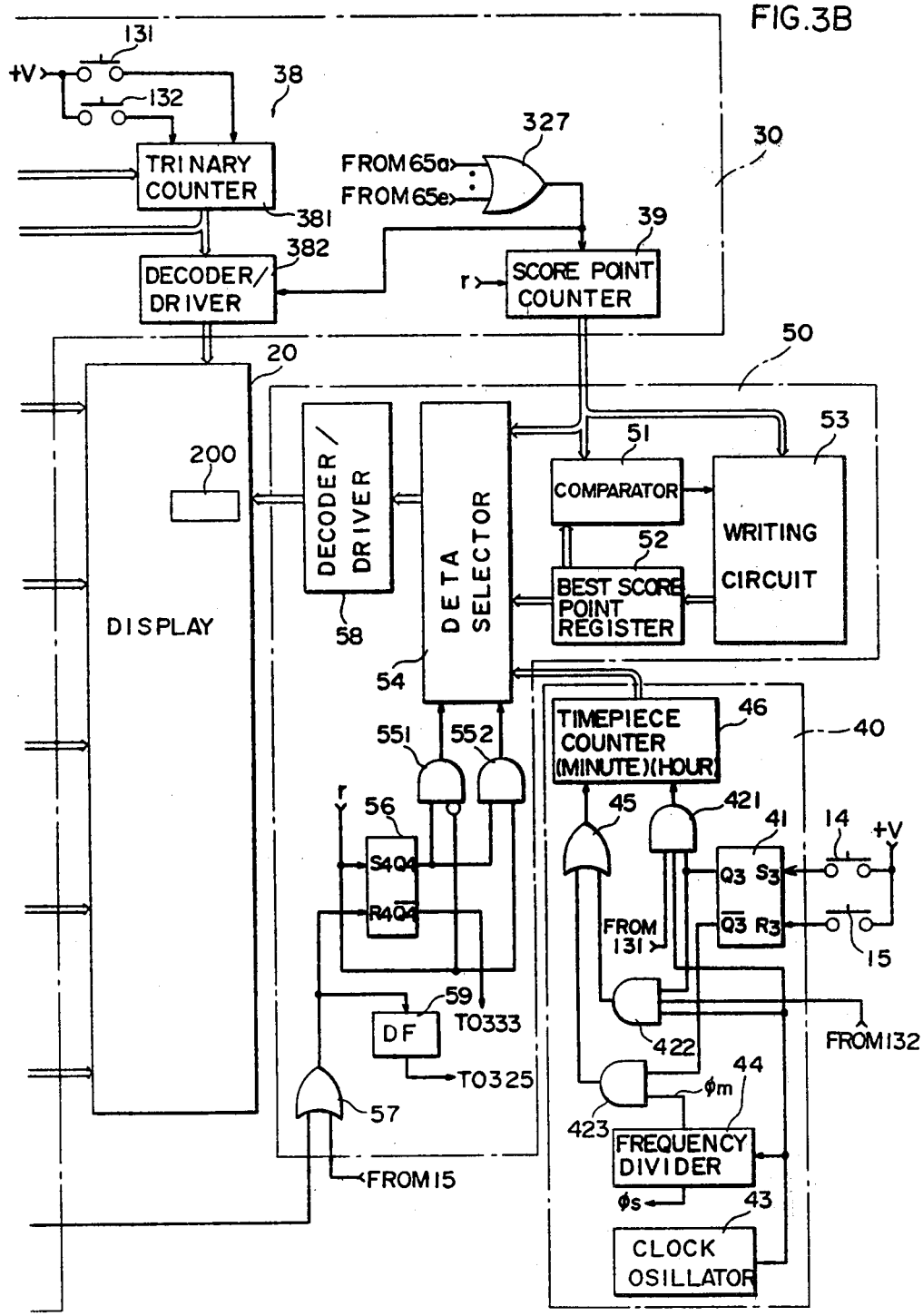

FIG. 2 is a view showing one example of a display pattern being displayed by the display apparatus 20 of the embodiment shown. The game displayed by the figure displaying game apparatus 10 of the embodiment shown is a mole hitting game, for example, The game of this type may be used in such various kinds of games wherein other kinds of moving targets are hit by operation of a player.

The display apparatus 20 of the embodiment comprises a numerical value displaying region 200 used both for displaying the current time information and for displaying the score of a game. The remaining display region of the display apparatus 20 constitutes a figure displaying region for the game. Therefore, a specific structure of the figure displaying regin in the case where the kind of the game is a mole hitting game, i.e. the moving target is a mole, will be described. The display apparatus 20 comprises five columns of segment series 20 to 25 formed extending upward or obliquely upward. Each of these segments columns 21, 22, 23, 24 and 25 comprises four segments 211 to 214, 221 to 224, 231 to 234, 241 to 244, or 251 to 254, respectively, for indicating the movement of each mole. The first to third segments from the bottom in the moving direction, i.e. 211 to 213, 221 to 223, 231 to 233, 241 to 243, or 251 to 253, of each of the segment series 21 to 25 have been shaped as if the ground surface has swelled to indicate as if a mole is moving underground. The segments 214, 224, 234, 244 and 254 at the end in the moving direction of the respective segments series 21 to 25 are shaped in a figure of a mole shape (referred to as a mole figure hereinafter). Segments 271 to 275 formed in a figure of a hammer shape (referred to as a hammer figure hereinafter) for hitting a mole coming out from the underground are disposed at the positions above the mole figure segments of the respective segment series 21 to 25. Segments 282, 283 and 284 of a human shaped figure (referred to as a hitting person figure hereinafter) are disposed at the positions above the hammer figure segments 272, 273 and 274. Segments 271' to 275' representing hammers as raised are formed at the positions of an extension the arm of the respective segments 282, 283 and 284 of the hitting person figures. In order to visually display the arms of the hitting person figures represented by the respective segments 282, 283 and 284 switchably between a hammer raised state and a hammer swung down state, similar segments are also formed in the swung down position.

Now an outline of the game will be described. A segment series is selected at random among the respective segment series 21 to 25 and the number of segments being visually displayed is increased in succession from the bottom in the upward direction. During a time period until the mole figure formed at the end in the moving direction of the said column is displayed or during a predetermined time period after the mole figure is displayed, a player operates the above described operating switches 131 and 132, thereby to cause visually the hitting person figure to move to the position corresponding to the column of the mole figure being displayed. A corresponding relation between the hitting person figure and the column of the mole figure has been determined such that in the illustrated case the mole figure represented by the segment 214 or 234 is hit when the hitting person figure is displayed by the left end segment 282, the mole figure displayed by the segment 224 or 244 is hit when the hitting person figure is displayed by the middle segment 283, and the mole figure displayed by the segment 234 or 254 is hit when the hitting person figure is displayed by the right end segment 284. The apparatus is further adapted such that when a corresponding relation is established between the display position of the hitting person figure and the display position of the mole figure of the respective columns, a score point (say one point) is awarded, whereas when the hitting person figure is not moved to the corresponding position within a predetermined time period while the mole figure has been displayed, the same is handled as a hitting mistake.

In other words, the hitting symbols or figures and the hitting person symbols or figures represent a first kind of symbols or symbol segments. These first kind symbol segments are controlled and manipulated by the operator or player of the game apparatus. These first type or kind of symbols or symbol segments are driven for display in a first symbol displaying region of the displaying field. In the example of FIG. 2 the first symbol displaying region is substantially the upper half of the field of view of the display apparatus 20.

According to this perspective on the invention the so-called moving symbols represent a second kind of symbols or symbol segments. These second kind symbol segments are driven by signals generated internally by the game apparatus for display independently of the first kind symbols or symbol segments. The second kind symbols or symbol segments are driven for display over a plurality of paths in a second symbol displaying region. In the example of FIG. 2 the second symbol displaying region is in substantially the lower half of the field of view of the display 20 where the multiple paths of the moving symbol segments are located. As herein explained, an internally generated display driving signal actuates or drives the second kind symbol segments over selected paths of the multiple paths in the second symbol displaying region. It is then up to the operator or the player of the game by manipulating the first kind symbols to bring the first and second kinds of symbols or symbol segments into a predetermined relationship. In particular, the first kind symbol segments are oriented in a general first direction along a plurality of first direction lines. The second kind symbol segments are arranged along a plurality of paths which respectively intersect the first direction lines. It is up to the player to select with appropriate timing the correct first kind symbols and first direction line in response to apparent movement of second kind symbol segments over a particular path.

In the display apparatus example of FIG. 2 this arrangment presents the appearance of the first kind symbol segments hitting the second kind symbol segments driven for display on the game apparatus. The game automatically scores success in achieving the predetermined relationship and this may be presented in the numerical value displaying region at the bottom of the field of view of the display apparatus example of FIG. 2.

A predetermined number of hitting mistakes are allowed in one game and such hitting mistakes correspond to the predetermined number of times that one game is ended followed by the lapse of a predetermined time period without the corresponding relation set forth above being established by the player. Thereafter the apparatus automatically assumes the timepiece mode, whereby the current time is displayed in the numerical value information display portion 200. Meanwhile, in order to notify the player of the number of times of hitting mistakes, as necessary, segments 291 to 293 of figures representing the hitting mistakes of the number (in the embodiment shown, three) corresponding to the allowed number of mistakes are formed.

Furthermore, the embodiment shown is adapted such that the hour and minute of the current time are displayed by the numerical value information display portion 200 and the second unit is visually displayed by the use of the segment series 21 and 25 at both sides, while the hitting person figure is displayed to be moved so that the mole figure of each of the segment series 21 and 25 at both sides is hit.

The display apparatus 20 formed with the respective figures as described above may employ a liquid crystal display apparatus, for example. Specifically, one electrode of the liquid crystal display apparatus is formed in a shape of each segment as shown, while the other electrode (common electrode) is formed in common on the whole surface of the liquid crystal display apparatus.

Figure 3:
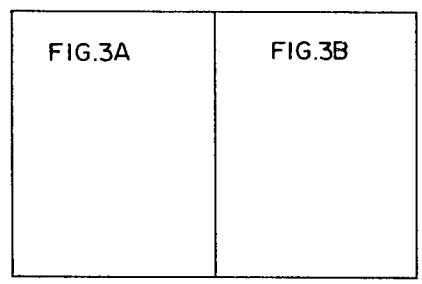
FIGS. 3A and 3B are a block diagram of the inventive figure display game apparatus.

FIG. 3 is a block diagram of a figure displaying game apparatus of one embodiment of the present invention. The figure displaying game apparatus 10 of the embodiment shown comprises the display apparatus 20, and a game displaying control circuit 30 including a circuit for controlling display by the above described segment series 21 to 25 and a circuit for controlling display of the above described hitting person figure segments 282, 283 and 284. Furthermore, as necessary, the apparatus 10 is provided with a current time information generating circuit 40 and a numerical value information displaying control circuit 50. In the following, a specific structure of each circuit will be described.

The start switches 121 and 122 are connected to the above described game display control circuit 30. The start switch 121 is operated in the case where a game is played using four segment columns excluding the segment column 23 shown in FIG. 2. The start switch 122 is operated in the case where a game is played using five segment columns 21 to 25. The depression signal of the start switch 121 is applied to the set input of a flip-flop 311 and is also applied to one input of an OR gate 321. The depression signal of the start switch 122 is applied to a reset input of the flip-flop 311 and is also applied to the other input of the OR gate 321. Accordingly, the flip-flop 311 stores the information representing that a mode for playing a game using four segment series is selected and the set output Q1 is applied to a segment series display control circuit 60c, to be described subsequently, as a disabling signal. The output of the OR gate 321 is applied to the set inputs of a flip-flop 312 and a flip-flop 56 to be described subsequently. The flip-flop 312 stores the information representing that either the start switch 121 or 122 is depressed. The set output Q2 of the flip-flop 312 is applied to one input of each of AND gates 331 and 332 as a signal representing that a game is being played when the output is in the high level and the set output Q2 of the flip-flop 312 is also applied to a clock generator 34 as an enabling signal.

The above described clock generator 34 comprises a reference clock oscillator 341, a programmable frequency divider 342 and a frequency division ratio controlling circuit 343 for controlling the frequency division ratio based on the score point in a score point counter 39 to be described subsequently, for the purpose of changing the visual display speed of the segment series in association with the score point during one game. Meanwhile, if it is not necessary to change the visual display speed of the respective segment series in association with the score point during one game, the clock generator 34 may simply comprise the reference clock oscillator 341 and a circuit including a frequency divider for frequency dividing the output of the reference clock oscillator 341. The frequency divided clock signal (the clock of 0.25 to 1 second period, for example) obtained from the clock generator 34 is applied to one input of an OR gate 322 and is also applied to an address counter 35. One second clock obtained from an AND gate 333 obtainable in the timepiece mode is applied to the other input of the OR gate 322. The clock ∅ obtained from the OR gate 322 is applied as a shift clock to segment series display control circuits 60a to 60e to be described subsequently in detail with reference to FIG. 4. The address counter 35 is responsive to each application of the frequency divided clock to make an advancing operation of the count value and the count value serves to designate the addresses of a read only memory 36. The read only memory 36 stores the data representing which column among the segment columns 21 to 25 shown in FIG. 2 should be visually displayed on a one-bit-in-one-address basis and the above described data is stored in address sequence so that the segment columns 21 to 25 being displayed may be different at irregular time intervals. The read only memory 36 provides the data of the addresses designated by the address counter 35 in a bit parallel fashion. The first bit data corresponding to the segment column 21 obtained from the read only memory 36 is applied through the AND gate 331 and the OR gate 322 to the segment column display control circuit 60a. The second to fourth bit data corresponding to the segment columns 22, 23 and 24 obtained from the read only memory 36 is directly applied to the segment column display control circuit 60b, 60c and 60d, respectively. Furthermore, the fifth bit data corresponding to the segment column 25 obtained from the read only memory 36 is applied through the AND gate 332 and the OR gate 324 to the segment column display circuit 60e. The respective segment column display control circuits 60a to 60e are supplied with a reset signal r from the OR gate 321 and also supplied with the count value in a trinary counter 381 included in the circuit 38 for controlling the display of the hitting person figures. Furthermore, the non-coincidence output (i.e. the output representing a hitting mistake) of the segment column display control circuits 60a to 60e is applied to an OR gate 326 and a coincidence output (i.e. the output representing that a mole figure was successfully hit) is applied to an OR gate 327. The output of the OR gate 326 is applied to a trinary counter 371. The trinary counter 371 provides the count up output when the number of hitting mistake times becomes three, which output is applied to a timer 372 and is also applied to the reset input of the flip-flop 312. The output of the OR gate 327 is applied to a score point counter 39 and is also applied to a decoder/driver 382. The decoder/driver 382 is supplied with the output of a trinary counter 381. The trinary counter 381 is responsive to each depression of the operating switch 131 to make a subtracting operation until the minimum value of zero is reached, while the operating switch 132 is responsive to each depression to make an adding operation to reach the maximum of 2, and when the preset data is inputted from a presetter 383, the above described count values are preset based on the above described data.

A reset switch 14 and a timepiece mode switch 15 shown in FIG. 1 are connected in association with the above described current time information generating circuit 40. The depression signal of the reset switch 14 is applied to the set input of the flip-flop 41 and the depression signal of the current time mode switch 15 is applied to the reset input of the flip-flop 41. The set output Q3 of the flip-flop 41 is applied to one input of each of the AND gates 421 and 422. The reset output of the $\overline{Q3}$ of the flip-flop 41 is applied to one input of the AND gate 423. Each of the AND gates 421 and 422 is supplied, at one input thereof, with the output clock of the clock oscillator 43. The AND gate 421 is supplied with, at the remaining input, the depression signal of the above described operating switch 131. The AND gate 422 is supplied, at the remaining input, with the depression signal of the operating switch 132. The output of the clock oscillator 43 is applied to the frequency divider 44. The frequency divider 44 frequency divides the output of the clock oscillator 43, thereby to provide a one second clock $\phi s$, which is applied to the AND gate 333, and also provides a one minute clock $\phi m$, which is applied to the AND gate 423. The outputs of the AND gates 422 and 423 are applied through the OR gate 45 to a clock counter 46 as a carry signal of the digit of "minute". The output of the AND gate 421 is applied to a clock counter 46 as a quick advancing signal of the digit of "hour".

Specifically, the above described numerical information display control circuit 50 is structured in the following manner. A comparator 51 serves to compare during the present one game obtained from the above described score point counter 39 and the best score point attained in the previous game and stored in a best score point storing register (hereinafter referred to as a best score point register) 52, thereby to provide a write enable signal to a write circuit 53 if and when the count value in the score point counter 39 is larger. The write circuit 53 serves to write the count value in the score point counter 39 in the best score point register 52 if and when the write enable signal is provided. The output of the best score point register 53 and the output of the score point counter 39 and the output of the previously described clock counter 46 are applied to a data selector 54. The data selector 54 is responsive to the logical state of two bits of the outputs of the AND gates 551 and 552, thereby to select which data should be applied to the decoder/driver 58. For example, the data selector 54 selects the current time if and when both of the outputs of the AND gates 551 and 552 are the low level (the logic "00"), selects the score point when only the output of the AND gate 551 is the high level (the logic "10"), and selects the best score point when only the output of the AND gate 552 is the high level (the logics "01"). The decoder/driver 58 decodes the numerical information of the score point, the best score point, or the current time obtained from the data selector 54, thereby to control a display by selecting the segments in the numerical value information display portion 200 formed in the display apparatus 20.

Figure 4:
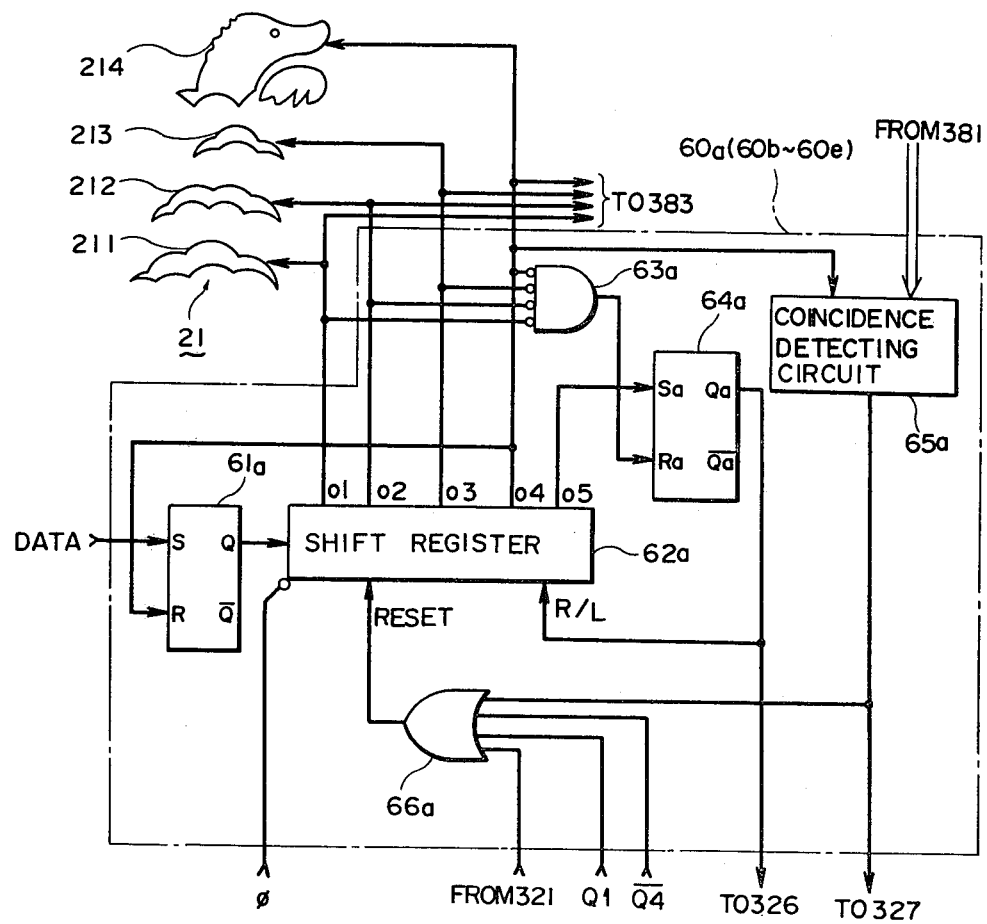
FIG. 4 is a schematic diagram of segment column display control circuits 60a to 60e.

FIG. 4 is a specific schematic diagram of the segment column display control circuits 60a to 60e. Meanwhile, in the figure only the circuit 60a corresponding to the segment series 21 is displayed. The set input of the flip-flop 61a is supplied with the first bit data through the above described OR gate 323. The set output Q of the flip-flop 61a is applied to the shift register 62a as the data. The shift register 62a comprises five bit cells. The outputs 01 to 03 of the first to third bit cells of the shift register 62a are applied to the segments 211 to 213 of the segment series 21 shown in FIG. 2. The output o4 of the fourth bit cell of the shift register 62a is applied to the segment 214 and is also applied to the reset input of the flip-flop 61a and is further applied to the coincidence detecting circuit 65a. The outputs of the first to fourth bit cells of the shift register 62a are applied to the presetter 383 and are also applied to one input of the AND gate 63a, after inversion. The output of the AND gate 63a is applied to the reset input of the flip-flop 64a. The output o5 of the fifth bit cell of the shift register 62a is applied to the set input of the flip-flop 64a. If and when the set output Qa of the flip-flop 64a is the low level, the shift register 62a is commanded to make a rightward shift operation and if and when the set output Qa of the flip-flop 64a is the high level, the shift register 62a is commanded to make a leftward shift operation. Furthermore, the set output Qa (the high level) of the flip-flop 64a is withdrawn as a non-coincidence detected output representing a hitting mistake.

The count value of the above described trinary counter 381 is applied to the coincidence detecting circuit 65a. At the timing when the coincidence detected commanding signal of the fourth bit output o4 is applied, the coincidence detecting circuit 65a provides a coincidence output of the high level in the case where the count value of the trinary counter 381 is 0, thereby to reset the shift register 62a through the OR gate 66a. Furthermore, the OR gate 66a is supplied with the reset signal r.

Meanwhile, since the other segment column display control circuits 60b to 60e are structured in substantially the same circuit configuration as that of the segment column display control circuit 60a shown in FIG. 4, the foregoing description of the segment column display control circuit 60a is incorporated in the following description of the segment column display control circuits 60b to 60e by replacing the subscript a of various reference characters of the segment column display control circuit 60a by the corresponding subscript letters of the segment column display control circuits 60b to 60e. Therefore, in the following only those portions of the segment column display control circuits 60b to 60e differently structured from that of the circuit 60a will be specifically described. If the segment column display control circuit is the circuit 60b for controlling display of the segment column 22, the above described coincidence detecting circuit is implemented by a circuit 65b for detecting that the count value of the trinary counter 381 is unity. If the segment column display control circuit is the circuit 60c for controlling display of the segment column 23, the above described coincidence detecting circuit is implemented by a circuit 65c for detecting that the count value in the trinary counter 381 is 0 or 2. If the segment column display control circuit is a circuit 60d for controlling display of the segment column 24, the above described coincidence detecting circuit is implemented by a circuit 65d for detecting that the count value of the trinary counter 381 is unity. If the segment column display control circuit is a circuit 60e for controlling display of the segment column 25, the above described coincidence detecting circuit is implemented by a circuit 65e for detecting that the count value of the trinary counter 381 is 2. If and when the game mode for playing a game using four segment columns is selected, the set output Q1 of the flip-flop 311 is applied to the OR gate 66c of the segment column display control circuit 60c in order to disable visual display of the middle segment column 23. For the purpose of displaying the second unit by the use of the segment columns 21 and 25 at both sides and to disable visual display of the segment columns 22, 23 and 24 in the timepiece mode, the reset output $\overline{Q4}$ of the flip-flop 56 is applied to the OR gates 66b, 66c and 66d included in the segment column display control circuits 60b, 60c and 60d.

Now that the structural features of the embodiment were described in the foregoing, the operation of the embodiment shown will be described in detail with reference to FIGS. 1 to 4. At the outset description will be made of a case where a game is played using the four segment columns 21, 22, 24 and 25. In this case, a player depresses the start switch 121. Accordingly, the score point counter 39 is reset and the flip-flops 311 and 312 are set responsive to the output of the OR gate 321. During the depressed period of the start switch 121, the high level signal is applied to the OR gates 66a to 66e of the respective segment column display control circuits 60a to 60e. Therefore, the shift registers 62a to 62e of the respective control circuits 60a to 60e are kept reset. Furthermore, during the depressed period of the start switch 121, the AND gate 552 is kept providing the high level output. Therefore, during the time period when the start switch 121 is depressed, the data selector 54 provides the best score point data stored in the best score point register 52 to the decoder/driver 58. Accordingly, during the depressed period of the start switch 121, the best score point attained in the previously played game is displayed by the numerical value information display portion 200 of the display apparatus 20. If depression of the start switch 121 is once released, the output of the AND gate 552 turns to the low level and the output of the AND gate 551 turns to the high level. Therefore, the data selector 54 thereafter provides the score point data inputted from the score point counter 39 to the segment decoder 58. The set output Q1 of the flip-flop 311 is applied to the OR gate 66a of the segment column display control circuit 60c, whereby the reset state of the shift register 62c is maintained, and visual display by the segment column 23 is prevented. The set output Q2 of the flip-flop 312 enables the AND gates 331 and 332 and also enables the clock generator 34. Accordingly, the reference clock oscillator 341 generates a reference clock, which is applied to the programmable frequency divider 342. Although the frequency division ratio of the programmable frequency divider 342 is controlled by the frequency division ratio control circuit 343, the score point at the beginning is relatively small and therefore the reference clock is frequency divided at a relatively large frequency division ratio. The frequency divided clock is applied to the address counter 35 so that the count value thereof is advanced and is also applied to the shift registers 62a to 62e as a shift clock φ. At that time, the read only memory 36 provides the data of the address designated by the count value of the address counter 35 in a bit parallel fashion and the data thus obtained is applied directly or through suitable gates to the set inputs of the flip-flops 61a to 61e included in the respective segment column display control circuits 60a to 60e.

Now assuming that the data thus read from the read only memory 36 contains only the logic one in the first bit data commanding visual display of only the segment column 21, the flip-flop 61a is set. The set output of the flip-flop 61a is applied to the shift register 62a. The shift register 62a is loaded with the set output of the flip-flop 61a, i.e. the high level, at the timing when the shift clock φ is applied, thereby to store the logic one in the first bit cell. As a result, the segment 211 of the segment column 21 is visually displayed. At the timing when the following shift clock φ is applied, the logic one is stored in the first bit cell and the second bit cell of the shift register 62a. Therefore, the segments 211 and 211 are visually displayed. Likewise thereafter, each time the shift clock φ is applied, the number of bit cells storing the logic one increases, while the stored data is shifted rightward, so that the segments are in succession visually displayed like the segments 211 to 213 and 211 to 214. Thus the respective segments 211 to 214 of the segment column 21 are in succession visually displayed and the same looks to the player as if a mole is moving.

On the other hand, the player realizes that the segment column 21 is being visually displayed and, for the purpose of hitting the mole figure of the said segment column 21, the player operates the operating switch 131 to move the hitting person figure leftward to the position of the segment 282. At that time, the trinary counter 381 makes a subtracting operation responsive to each depression of the operating switch 131 and when the count value reaches 0 the subtracting operation is stopped thereafter in spite of further depression of the operating switch 131. If and when the count value in the trinary counter 381 becomes 0, the decoder/driver 382 visually displays the left end segment 282. In the case where the mole figure representing segment 214 has not yet been displayed at that time, the segments 282, 271' and 273' are visually displayed to achieve the hitting person figure with the hammer figures raised with both hands. When the logic one is stored in the fourth bit cell of the shift register 62a, the segment 214 is visually displayed. At that time, the output o4 of the fourth bit cell is applied to the coincidence circuit 65a as a coincidence detection enabling signal. The coincidence detecting circuit 65a provides the coincidence output if and when the count value of the trinary counter 381 is 0. The coincidence output is applied through the OR gate 327 to the score point counter 39. The score point counter 39 counts the output pulse of the OR gate 327, thereby to make accumulative addition of the score point. The output of the OR gate 327 is applied to the decoder 382. Accordingly, the segment 271' and the segment representing the arm having the hammer corresponding to the segment 271' are extinguished and the segment 271 and the segment representing the arm corresponding to the segment 271 are visually displayed responsive to the output of the decoder 382. As a result, such display looks to the player as if the hitting person hits the mole with the hammer. Thus, when the player successfully hits the mole of the segment column 21, the shift register 62a is reset responsive to the cincidence detected output obtained through the OR gate 66a and the displayed figures by the respective segments 211 to 214 of the segment column 21 are extinguished.

Thereafter, likewise the segment display columns corresponding to the rear out data are visually displayed to be changeable from the bottom in the upward direction based on the data read out from the read only memory 36. When the player moves the hitting person figure toward the position corresponding to the segment column being visually displayed by operating the operating witch 131 or 132, a mole is hit with the hammer and the score point is accumulatively counted.

Meanwhile, if and when the player commands movement of the display position of the hitting person figure through operation of the operating switch 131 or 132 but the display position as moved does not correspond to the segment column being visually displayed, such becomes a hitting mistake. In such a case, display is controlled in the following manner. For example, description will be made of an assumed case wherein a hitting mistakes occurs in a state wherein the segment column 21 is being visually displayed. If and when a state is reached in which the logic one is stored in the respective first to fourth bit cells of the shift register 62a, the respective segments 211 to 214 of the segment column 21 are visually displayed in such a state. When the shift clock $\phi$ is applied thereafter, the output o5 of the fifth bit cell of the shift register 62a becomes the high level signal and the flip-flop 64a is set. The set output Qa of the high level from the flip-flop 64a is applied as a non-coincidence output through the OR gate 326 to the trinary couner 371. Accordingly, the count value of the trinary counter 371 becomes 1, thereby to store information representing that the first hitting mistake has occurred. The set output Qa of the high level from the flip-flop 64a is applied to the shift register 62a as a left shift enabling signal. Therefore, the shift register 62a makes a leftward shifting operation one bit by one bit upon each application of the shift clock $\phi$ thereafter, thereby to store in succession the logic zero from the more significant bit to the less significant bit. Thus, if a hitting mistake occurs, the segments 214, 213, 212 and 211 of the segment column 21 are in succession extinguished, so that the display looks as if the mole burrows into the ground.

In the case where three hitting mistakes occur while the game is being played in the above described manner, the trinary couner 371 becomes a count up state and the timer 372 is enabled, while the flip-flop 312 is reset. At the same time, the clock generator 34 stops generation of the frequency divided clock and accordingly visual display of the segment columns 21 to 25 is stopped. Thus, one game is ended.

Now, as a preferred embodiment, description will be made of a case where the timepiece mode is selected so that the current time information is displayed by the numerical information display portion 200 and the second is displayed by the use of the figures used in playing the mole hitting game. If and when a time up signal is obtained from the above described timer 372 after the lapse of a predetermined time period after the count up output of the trinary counter 371, the time up signa is applied through the OR gate 57 to the flip-flop 56 to reset the same. The resetting of the flip-flop 56 establishes selection of the timepiece mode. Meanwhile, in the case where the player, or a user when the apparatus is used in the timepiece mode, selects the timepiece mode by his will, he selects the current time forcing switch 15. The timepiece mode ca also be selected when the depression signal of the current time forcing switch 15 is applied through the OR gate 57 to the flip-flop 56 to reset the same. When the flip-flop 56 is reset, both the outputs of the AND gates 551 and 552 become the low level and the current time (hour and minute) obtained from the timepiece counter 46 is applied from the data selector 54 to the decoder/driver 58. Accordingly, the decoder/driver 58 causes the numerical value information displaying region 200 to display the current time (hour and minute).

The embodiment shown is adapted such that while the hour and minute of the current time are displayed in a digital manner the second is also displayed using the respective segments for use in the mole hitting game. More specifically, the output of the OR gate 57 is differentiated by the differentiation circuit 59 and is applied through the OR gate 325 to the AND gate 334. The reset output $\overline{Q4}$ of the flip-flop 56 is applied to the AND gates 333, 334 and 335 and is also applied to the OR gates 66b, 66c and 66d included in the segment column display control circuits 60b, 60c and 60d. Therefore, the shift registers 62b, 62c and 62d corresponding to the segment columns 22, 23 and 24 are continually reset during the timepiece mode, whereby the segment columns 22, 23 and 24 are prevented from being visually displayed. The AND gate 334 provides a differentiated pulse, which is applied through the OR gate 323 to the shift register 60a. At that time, the AND gate 333 provides the one second clock $\phi s$ obtained from the frequency divider 44, which is applied through the OR gate 322 to the shift registers 62a and 62e as the shift clock φ. Accordingly, as in the case of the operation in the previously described game mode, the shift register 62a causes in succession visual display of the respective segments of the segment column 21 upon each application of the shift clock φ, but since the shift clock φ has been switched from the frequency divided clock to the one second clock φs at that time, a shifting operation is made per each second. As a result, the segment 211 is visually displayed at the first second and the segments 211 and 212 are visually displayed at the third second, the segments 211 to 213 are visually displayed at the third second, and the segments 211 to 214 are visually displayed at the fourth second.

Meanwhile, the outputs of the above described shift registers 62a and 62e are normally applied to the presetter 383. The presetter 383 is structured such that the numerical value 0 is preset in the trinary counter 381 at the timing when the output o3 of the third bit cell of the shift register 62a becomes the high level. Accordingly, the decoder 382 causes the segment 282 to be visually displayed at the timing when the segment 213 is visually displayed, so that the hitting person figure is moved to the left end position. At the timing when the segment 214 is visually displayed, the segment 271 is visually displayed, so that the mole figure is hit with the hammer. At that time, the coincidence output is obtained from the coincidence circuit 65a, whereby the shift register 62a is reset.

On the other hand, the coincidence output of the above described coincidence circuit 65a is applied to one input of the AND gate 335. Accordingly, the AND gate 335 provides the high level signa, which is applied through the OR gate 324 to the shift register 62e. Accordingly, the shift register 62e stores the logic one in the first bit cell, when the first shift clock φ is applied. Thereafter, the shift register 62e is responsive to each application of the shift clock φ to make a rightward shifting operation of the bit cell storing the logic one, while the respective segments of the segment column 25 are visually displayed from the bottom in the upward directin in succession. At the timing when the output of the second bit cell of the shift register 62e becomes the high level and the segment 252 is visually displayed, the presetter 383 presets the numerical value one in the trinary counter 381. Accordingly, the decoder/driver 382 causes the segment 283 to be visually displayed and the hitting person figure to be moved to the middle position. When the shift clock φ is applied with a one second delay from the timing when the segment 252 is visually displayed, the shift register 62a provides the high level output from the third bit cell, thereby to cause the segment 213 to be visually displayed. At that time, the presetter 383 presets the numerical value 2 in the trinary counter 381. Therefore, the decoder/driver 382 causes the segment 284 to be visually displayed, thereby to cause the hitting person to be moved to the right end. At the timing when the following shift pulse φ is applied after the segment 254 is visually displayed, the segment 275 is visually displayed.

Thus, the segment column 21 or 25 is alternately selected for every five seconds, such that the respective segments are in succession visually displayed, while the mole figure is hit, with the result that the current time is displayed in terms of the second unit by way of the displayed position of the segment.

As described in the foregoing, according to the embodiment shown, visual display is made in the timepiece mode such that the game is automatically played by the use of the segments of the figures used for the game while visual display is made of the time period in terms of the second unit. As a result, an advantage is brought about that the way of playing the game is notified to a user who does not know the way of playing the game, while displaying the current time.

Figure 5:
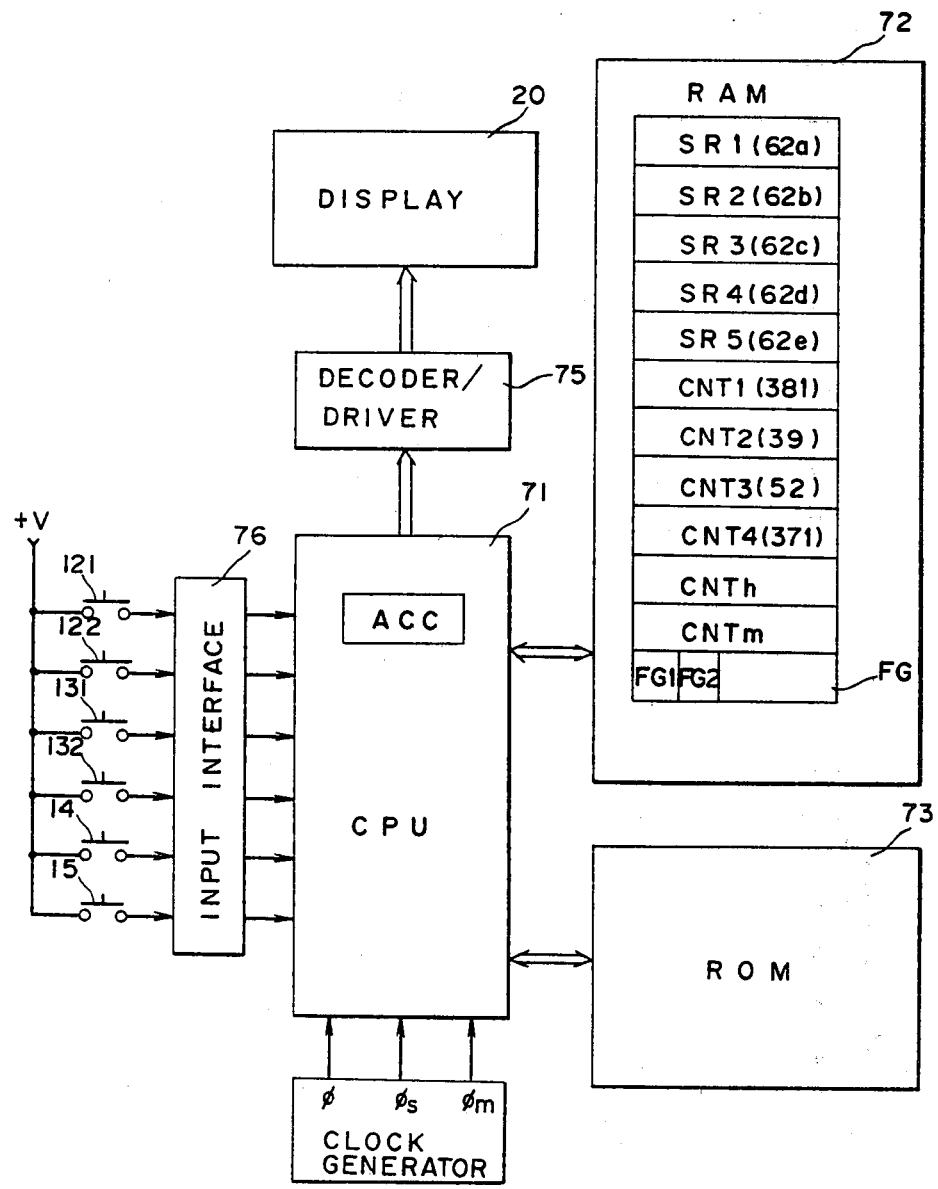
FIG. 5 is a block diagram of another embodiment of the present invention.

FIG. 5 is a block diagram showing another embodiment of the present invention. The embodiment shown employs a microprocessor or a microcomputer in order to achieve the control corresponding to that previously described in conjunction with FIGS. 3 and 4. The embodiment is structured such that the operation signals from the respective switches 121, 122, 131, 132, 14 and 15 shown in FIG. 1 are applied through an input interface 76 to a central processing unit 71. The central processing unit 71 is also connected to a random access memory 72 and a read only memory 73. The random access memory 72 comprises various storing regions such as register regions, counter regions, flag regions and the like. Registers SR1 to SR5 included in the random access memory 72 correspond to the shift registers 62a to 62e included in the segment column display control circuits 60a to 60e previously described in conjunction with FIGS. 3 and 4. Counter regions, CNT1, CNT2, CNT3 and CNT4 included in the random access memory 72 corresponds to the trinary counter 381, the score point counter 39, the best score point register 52 and the trinary counter 371 previously described in conjunction with FIG. 3. Counter regions CNTh and CNTm cooperate with each other to constitute that corresponding to the timepiece counter, so that the counter region CNTh measures the time of the digit of "hour" and the counter region CNT, measures the time of the digit of "minute". A flag region FG comprises a game flag FG1 for use in storing which one of the first and second game modes is selected, and a hammer down flag FG2 for storing that the hammer is ready for swinging down. The read only memory 73 stores the program such as a flow diagram shown in FIGS. 6 to 8c to be described subsequently, stores the data for making display at the respective segments for each display position of the hitting person figures with respect to a state of the hammer raised and a state of the hammer swung down, and also stores the data for generating a random number. The central processing unit 71 is also connected to the clock generator 74. The clock generator 74 generates the one minute clock φm and the one second clock φs, and the clock pulse corresponding to the shift clock φ obtained from the frequency divider 44 previously described in conjunction with FIG. 3. The displaying information obtained from the central processing unit 71 is applied to the display apparatus 20 through the decoder/driver 75. The display apparatus may be the same as that shown in FIG. 2.

Figure 6:
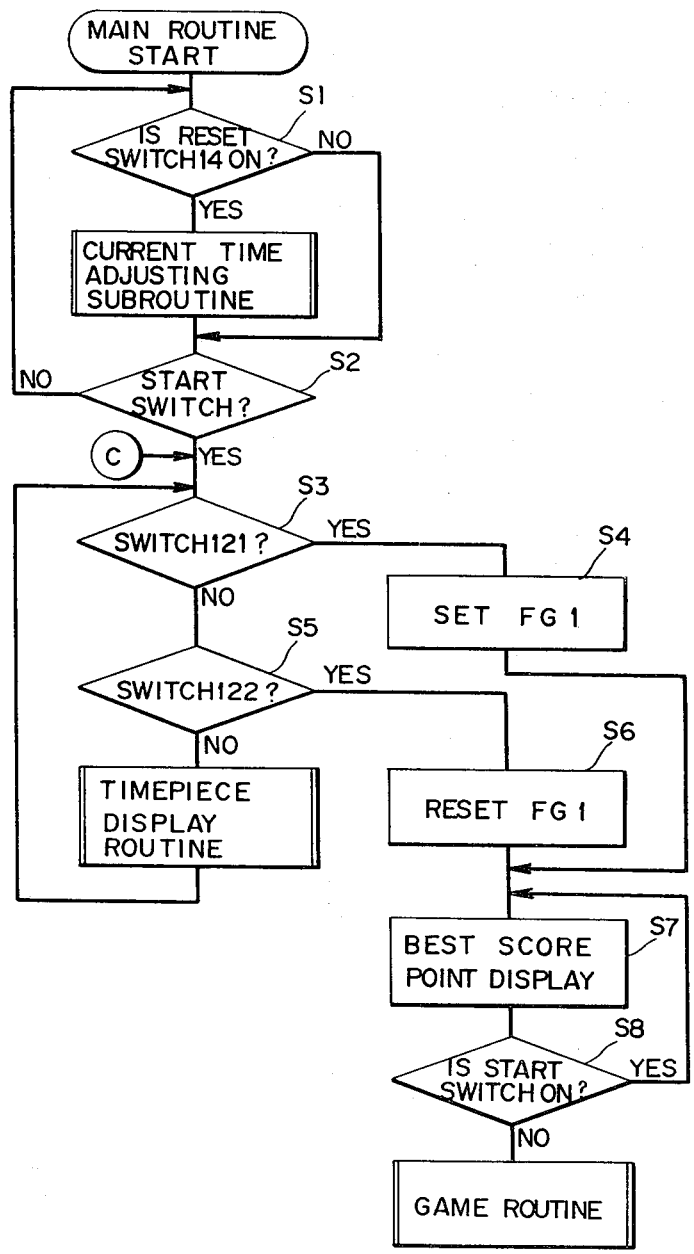
FIG. 6 is a flow diagram showing a main routine of the present invention.
Figures 1, 7A:
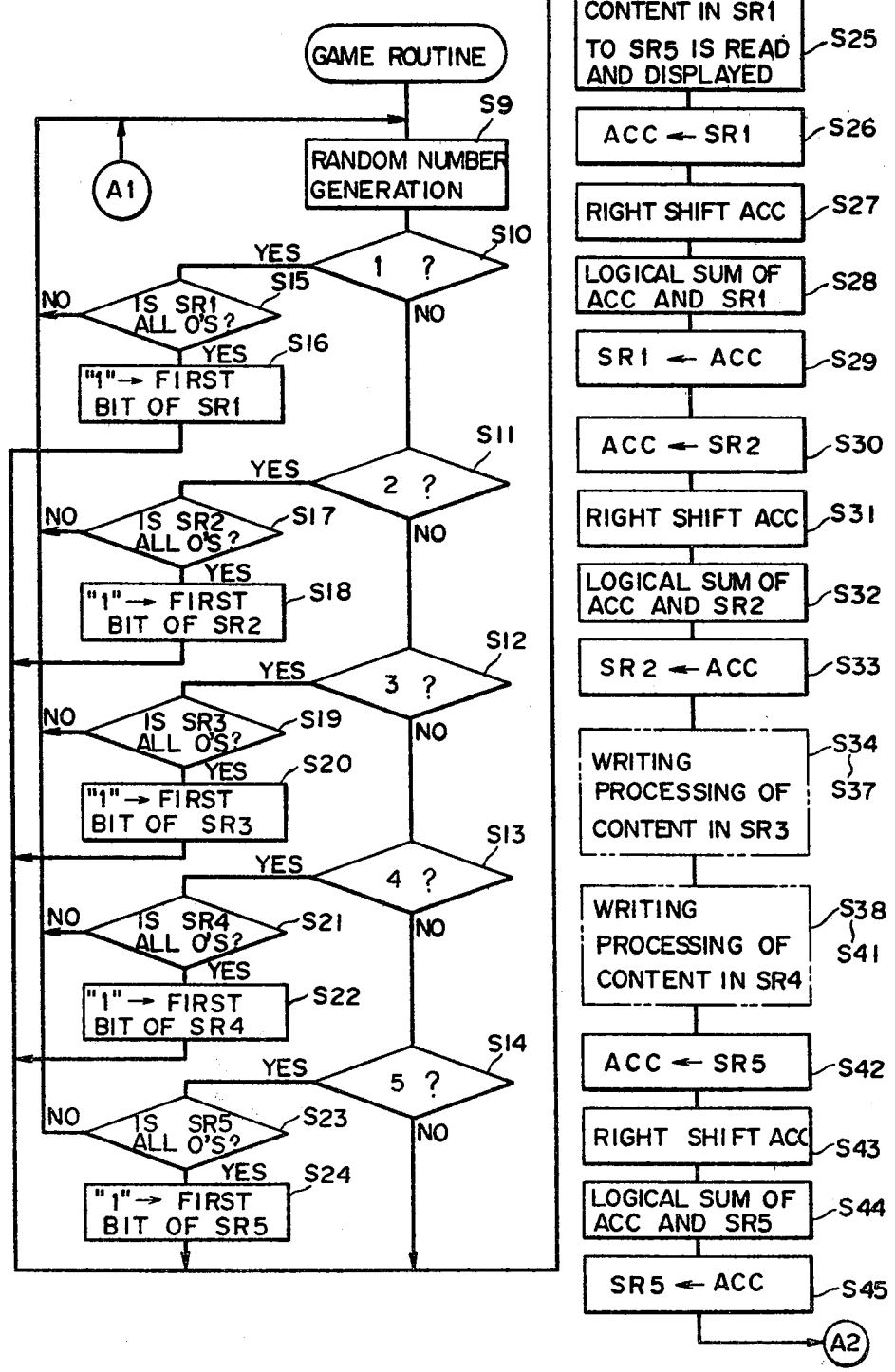
Figures 2, 7A:
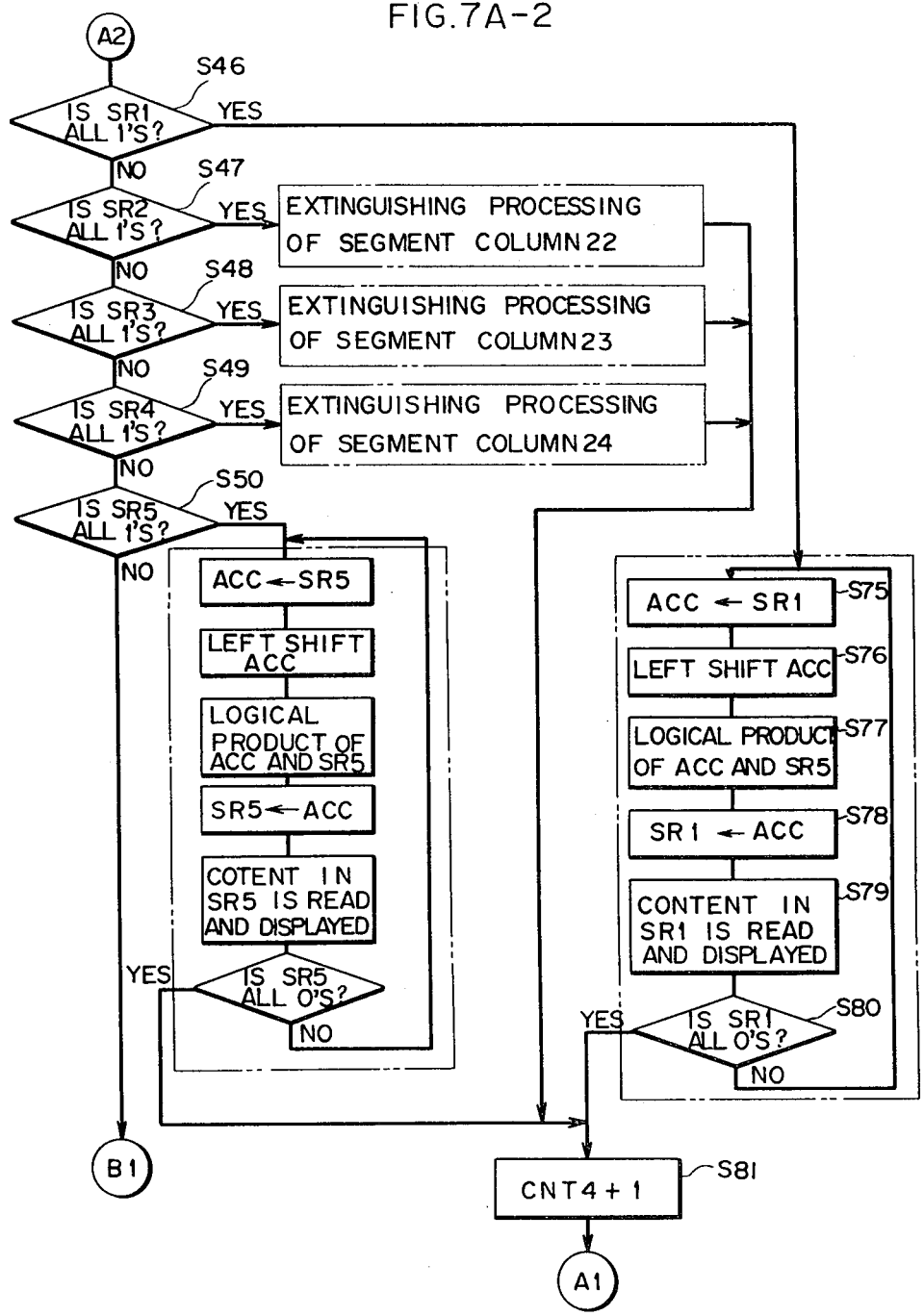
Figures 1, 7B:
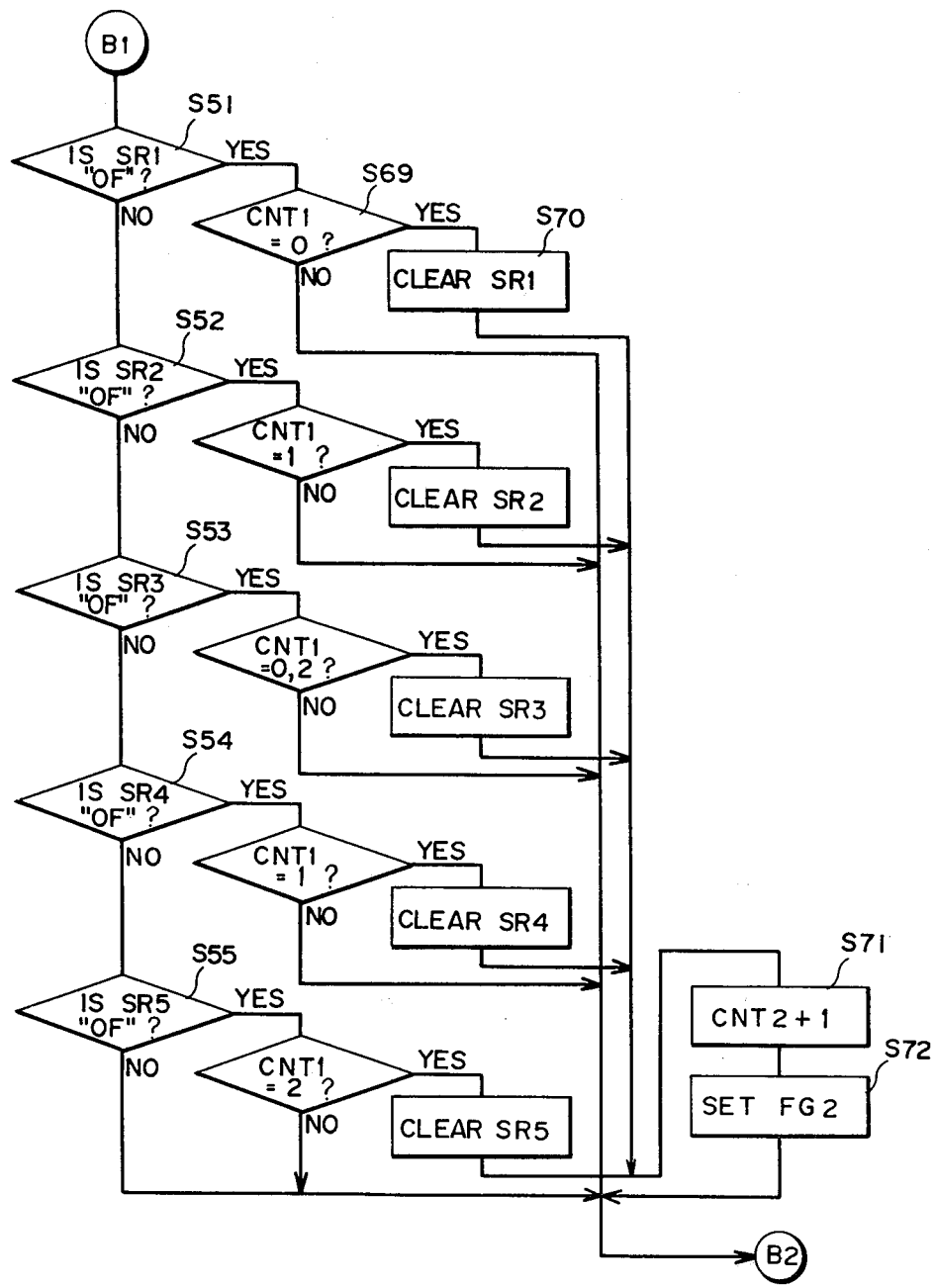
Figures 2, 7B:
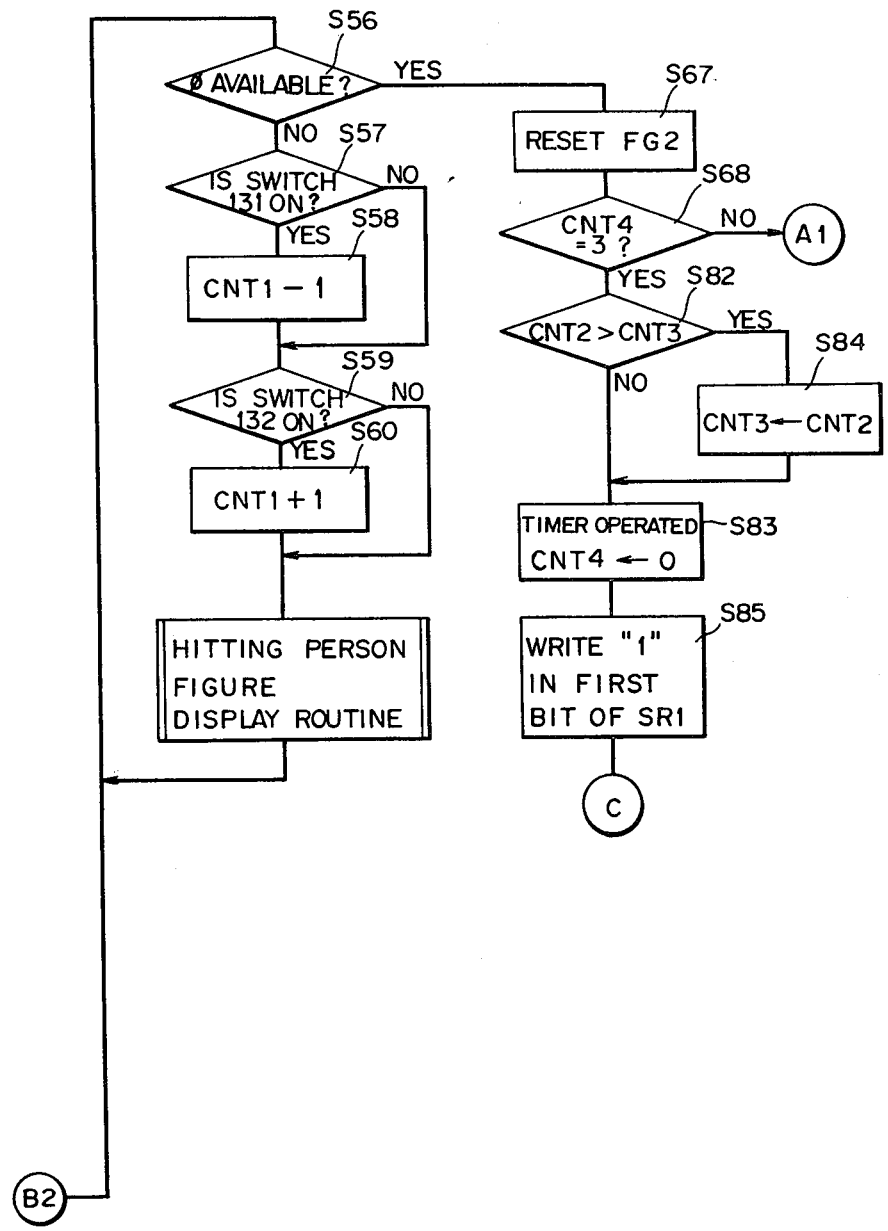
Figure 7C:
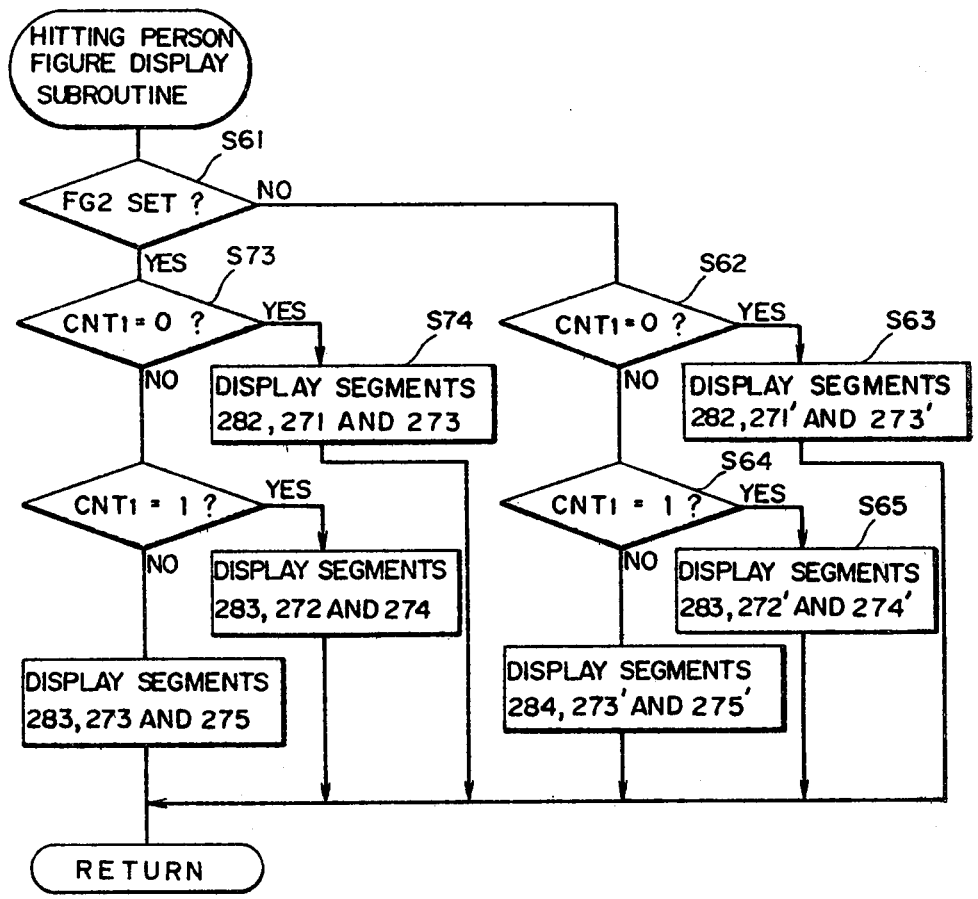
Figure 8A:
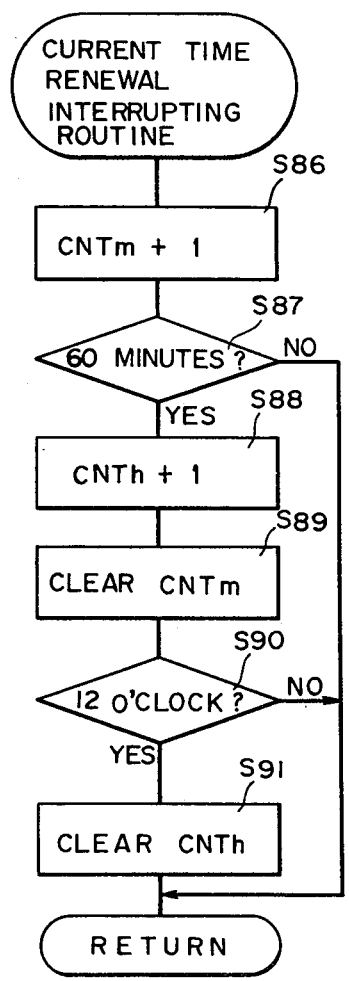
FIGS. 8A to 8C are flow diagrams for explaining the processing operation of the current time associated information.
Figure 8B:
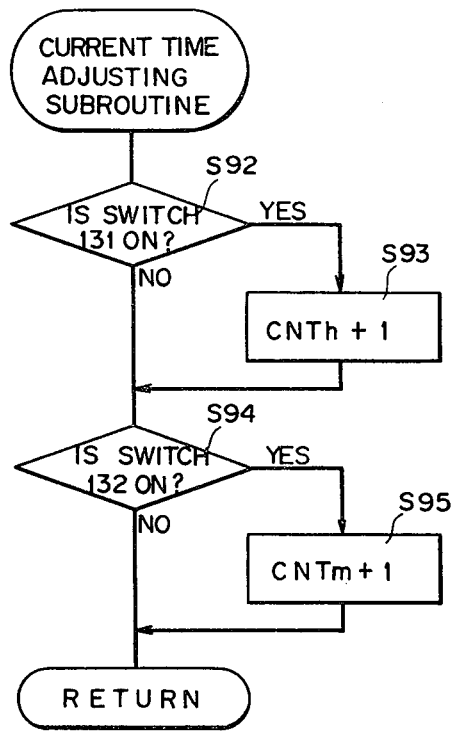
Figure 8C:
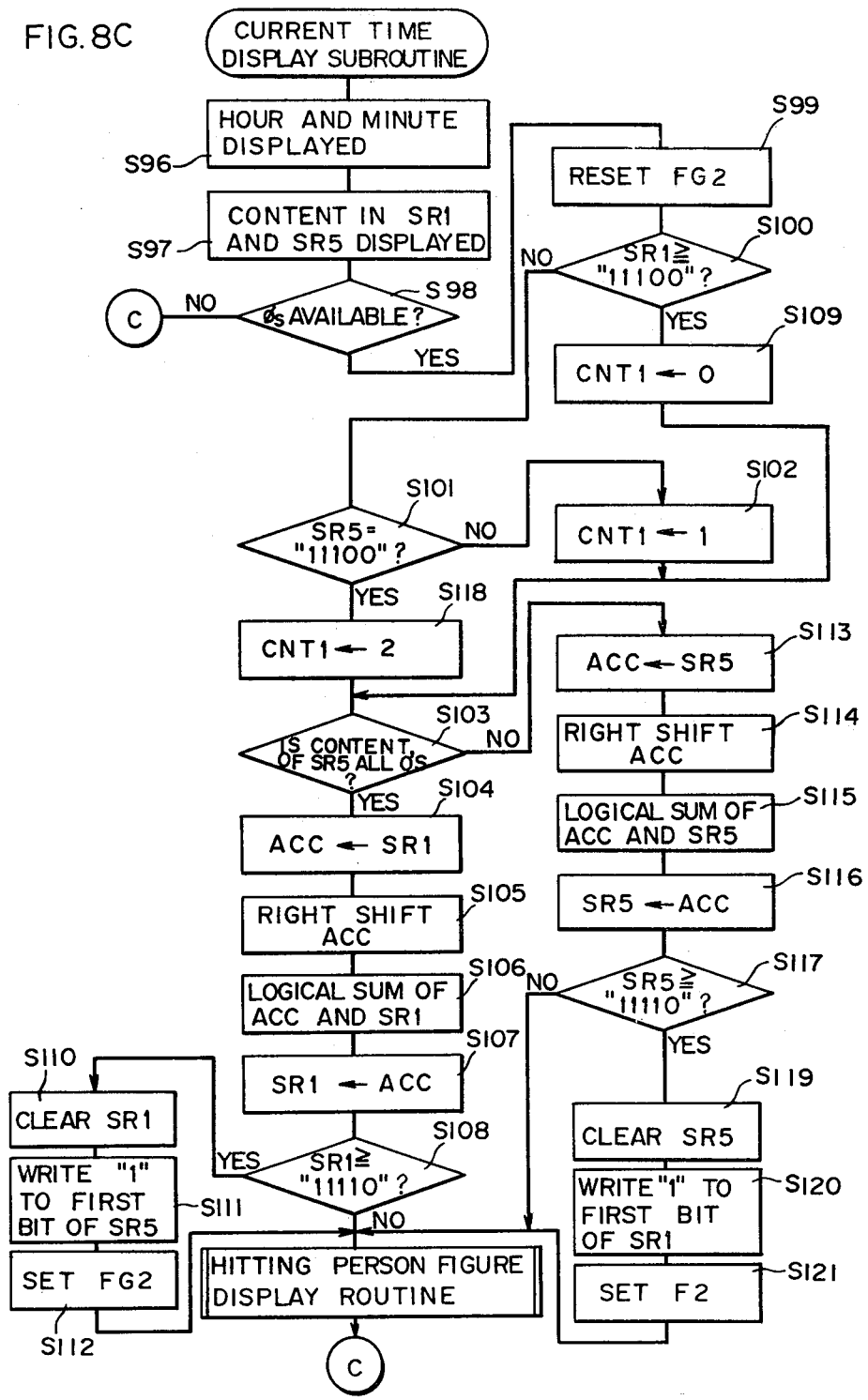

FIG. 6 is a flow diagram of a main routine of the FIG. 5 embodiment. FIGS. 7A to 7C are flow diagrams of a game routine for explaining the operation of the game mode which constitutes an essential feature of the present invention. FIGS 8A to 8C are flow diagrams for explaining the operation of the timepiece mode.

Now referring to FIGS. 5 and 6, the operation of the main routine in the case of the FIG. 5 embodiment will be described. It is assumed that the apparatus is normally in a standby state and at the outset at the step S1 it is determined whether the reset switch 14 is turned on. More specifically, the fact that the reset switch 14 is turned on means a case where the current time adjustment is required as described previously and in such a case the program enters into the subroutine of the current time setting to be describe subsequently with reference to FIG. 8B. On the other hand, if the reset switch 14 has not been depressed, then at the step S2 it is determined whether either the start switch 121 or 122 is depressed. More specifically, it is determined whether initiation of the game mode has been commanded. Thus, the apparatus is structured to normally see whether either the start switch 121 or 122 has been depressed. If and when either the start switch 121 or 122 has been depressed, that at the following step S3 it is determined whether the depressed switch is the start switch 121. If and when the start switch 121 is depressed, this means that a game using four segment columns 21, 22, 24 and 25 on the display apparatus 20 is selected and therefore at the following step S4 the game falge FG1 is set. On the contrary, in the case where the start switch 122 has been depressed, the same is determined at the step 5. In such a case, it is meant that a game using the five segment columns 21 to 25 on the display apparatus 20 has been selected and at the following step 6 the game flag FG1 is reset. Meanwhile, when the program returns to the step S3 after completion of one game, one the start switches has been depressed at the step S3 or S5, at the timepiece mode shown to be described subsequently with reference to FIG. 8C (i.e. at the subroutine of the current time display mode), the current time is displayed and at the same time the second display is made by the use of the figures for playing the game.

Now referring to FIGS. 1, 2, and 5 to 7C, description will be made of the operation in the case where either the start switch 121 or 122 is depressed to select the game mode. If and when the start switch 121 is depressed, for example, at the step S4 the game flag FG1 is set and then at the step S7 the best score point as counted by the counter CNT3 is displayed by the numerical information display portion 200 shown in FIG. 2. Then at the step S8 it is determined whether either of the start switch 121 or 122 has been depressed and during the depression period of the start switch the best score point is continually displayed. Thereafter if once the depression of the start switch is released, the program proceeds to the game routine shown in FIGS. 7A to 7C.

In the game routine, first at the step 9 the data representing which segment column being stored in the read only memory 73 is to be displayed is generated in a random number manner. Such random number generation may be attained by writing the numerals 0 to 9 in a properly irregular manner in succession in the addresses of random number data storing regions of the read only memory 73, and by designating the segment column 21 with the numerical value 1, by designating the segment column 22 with the numerical value 2, by designating the segment column 23 with the numerical value 3, by designating the segment column 24 with the numerical value 4, by designating the segment column 25 with the numerical value 5, and by allotting the remaining numerical values 0, 6 to 9 as the data for not designating any display columns. Preferably, it is adapted such that the same ones among the numerical values 1 to 5 are not continually written in two addresses. Thus, when the data representing which segment column is to be displayed is generated in a random number manner at the step S9, then at the following steps 10 to 14 it is determined which column's segment should be enabled to make display based on the data.

Assuming a case where the numerical value 1 is read out, for example, at the step S10 it is determined that the numerical value 1, i.e. the data commanding visual display of the segment column 21 is read out and at the following step S15 it is determined whether the content of the register SR1 is zero. If any segments of the segment column 21 has been in a displayed state, the data need not be written in the register SR1 and therefore the program returns to the previously described step S9. On the other hand, if at the step S15 it is determined that the content in the register SR1 is 0, then at the following step S16 the logic one is written in the first bit of the register SR1. If the numerical value of the random number thus generated is 2, at the step S17 it is determined whether the content of the register SR2 is 0, and if the same is 0, at the following step S18 the logic one is written in the first bit of the register SR2. Likewise, if the numerical values of the random numbers generated are 3, 4 and 5, it is determined at the steps S19, S21 and S23 whether the contents in the registers SR3, SR4 and SR5 are 0, and if the same are 0, at the steps S20, S22 and S24 the logic one is written in the first bit of the said registers.

As described in the foregoing, in the case where the numerical values of the random numbers thus generated are those other than 1 to 5, or the numerical values are any one of 1 to 5, after the logic one is written in the first bit of any one of the registers SR1 to SR5 corresponding to the above described numerical values and then the program proceed to the step S25. At the step S25 the contents in the shift registers SR1 to SR5 are once read out and are applied to the decoder/driver 75, so that the respective segments of the respective segment columns 21 to 25 are displayed based on the contents in the respective registers SR1 to SR5. At that time, if the logic one is stored only in the first bit of the register SR1 and the logic zero is stored in the second to fifth bits of the register SR1, while the contents in the other registers SR2 to SR5 are all 0's, then only the segment 211 of the segment column 21 is visually displayed.

Then, at the steps S26 to S29, the central processing unit 71 performs the data processing for increasing by one the number of segments being displayed in the segment column 21. For example, if and when the logic one is stored only in the first bit of the register SR1 and the logic zero is stored in the second to fifth bits of the SR1, i.e. the content in the register SR1 is "10000", then in order to store in the register SR1 the data "11000" for displaying the segments 211 and 212, the following processing is performed. More specifically, at the step S26 the content stored in the register SR1 is transferred to the accumulator ACC and at the step S27 the content in the accumulator ACC is shifted rightward by one bit to attain "01000", and at the step S28 the content in the accumulator ACC and the content in the register SR1 are processed to evaluate the logical sum thereof, i.e. "11000", which logical sum is stored in the accumulator ACC, and at the step S29 the content in the accumulator ACC is transferred to the register SR1. Then in the same manner as the operation at the steps S26 to S29, at the steps S30 and S33 the register SR2 is loaded with the content. At the steps S34 to S37, the register SR3 is loaded with the content. At the steps S38 to S41, the register SR4 is loaded with the content. At the steps S42 to S45, the register SR5 is loaded with the content. In the figure, the processing at the steps S34 to S41 is shown in a simplified manner. If the registers SR2 to SR5 store all 0's, then the stored contents remain unchanged at that time. Then at the steps S46 to S50 the central processing unit 70 determines whether a hitting mistake has occurred with respect to the mole figures of the respective segment columns. More specifically, it is determined whether the contents in the respective registers SR1 to SR5 corresponding to the respective segment columns are all the logic one from the first to fifth bits. In other words, it is determined whether the content in any of the registers SR1 to SR5 is "11111" and accordingly the code "1F". If and when no hitting mistake of the mole figures is not detected at any of the steps S46 to S50, the program proceeds to the step S51 (see FIG. 7B). On the other hand, if and when a hitting mistake of the mole figures is detected at any of the steps, then display of the segment columns is extinguished as to be described subsequently.

If a hitting mistake is not detected at the previously described steps S46 to S50, then it is also detected at the steps S51 to S55 whether any of the segments 214, 224, 234, 244 and 254 of the mole figures have been displayed. This decision is made based on whether the registers SR1 to SR5 corresponding to the respective segment columns 21 to 25 have stored the logic one in the first to fourth bits, i.e. whether or not "11110". At that time, if the mole figure is not displayed in any of the segment columns, the program proceeds to the step S56.

Then at the step S56 it is determined whether the clock φ is inputted. If the clock φ is not inputted, then at the step S57 it is determined whether the operating switch 131 is operated. If the operating switch 131 has been operated, then at the step S58 one is substracted from the count value in the counter CNT1. Thereafter, if it is determined at the step S57 that the operating switch 131 has not been operated, then at the following step S59 it is determined whether the operating switch 132 has been operated. At that time, if it is determined that the operating switch 132 has been operated, then at the following step S60 one is added to the count value of the counter CNT1 and then the program proceeds to the display routine of the hitting person figure shown in FIG. 7C.

In the hitting person figure display routine, at the outset it is determined at the step S61 whether the hammer figure is to be displayed as raised or to be displayed as swung down based on whether the flag FG2 has been set. If the hammer down flag FG2 has not been set, then at the step S62 it is determined whether the content in the counter CNT1 is 0. If the content is not 0, then at the step S63 the data for displaying the hitting person figure at the left end and for displaying the hammer as raised is read from the read only memory 73 and is applied to the decoder/driver 75, thereby to visually display the segments 282, 271' and 273'. On the other hand, if the content of the counter CNT1 is not 0, then at the step S64 it is determined whether the content in the counter CNT1 is 1. If the content is 1, then at the step S65 the data for displaying the hitting person figure in the middle and for displaying the hammer as raised is read out from the read only memory 73 and is applied to the decoder/driver 75, thereby to visually display the segments 283, 272' and 274'. If the content in the counter CNT1 is not 1, then at the step 66 the data for displaying the hitting person figure at the right end and for displaying the hammer as raised is read out from the read only memory 73 and is applied to the decoder/driver 75, thereby to visually display the segments 284, 273' and 275'. Thereafter, the program returns to the above described step S56.

Likewise thereafter, the operation after the above described step S56 is repeated and, when the clock φ is inputted, then at the step S67 the hammer down flag FG2 is reset. Then at the step S68 it is determined whether the count value in the counter CNT4 is 3 and if the count value is not 3, the program returns to the above described step S9. Thereafter the same operation is repeated, so that the respective segment columns 21 to 25 and the segments 282 to 284 and the segments 271 to 275 and 271' to 275' are controllably displayed.

Now description will be made of a case where the segment 214 of the mole figure of the segment column 21 is displayed. When it is determined at the previously described step S51 that the segment 214 has been displayed based on the content in the register SR1, then at the following step S69 it is determined whether the display position of the hitting person figure is in the position where the mole of the segment column 21 can be hit based on whether the content in the counter CNT1 is 0. If and when it is determined that the display position of the hitting person figure is in the position where the mole figure of the segment column 21 can be hit, then at the step S70 the content in the register SR1 is cleared, i.e. the logic zero is written in all the bit positions. Thereafter, at the step S71 one is added to the count value in the counter CNT2, thereby to count the score point, and at the step S72 the hammer down flag FG2 is set and then the program returns to the previously described step S56.

If and when it is determined at the step S56 that the shift clock φ is not available, the above described steps S57 to S60 are repeated and the program proceeds to the hitting person figure display routine. At the step S61 of the hitting person figure display routine, it is determined that the hammer down flag FG2 has been set. Then at the step S73 it is determined whether the content in the counter CNT1 is 0. At that time, if the segment column for displaying the mole display is the column 21 and the display position of the hitting person figure is in the left end position, i.e. the segment 282 has been displayed, then it is determined that the count value in the counter CNT2 is 0. Then at the step S74 the data of the hitting person figure at the left end and the hammer as swung down is read out from the read only memory 73 and is applied to the decoder/driver 75, thereby to display the segments 282, 271 and 273. Thereafter, at the step S56 it is determined that the clock φ is available and through the steps S67 and S68 the program returns to the start of the game routine, i.e. the step S9.

By repeating the above described operation, the mole figures are visually displayed in the respective segment columns of the display apparatus 20 and the hitting person display corresponding to the segment column being visually displayed is displayed based on the operated state of the operating switch 131 or 132, the hammer is swung down.

Now description will be made of the operation in a case where a hitting mistake occurs with respect to the mole. For example, consider a case where all the segments 211 to 214 of the segment column 21 has been visually displayed and the hitting person figure has not been displayed at the left end position, i.e. the segment 282 has not been displayed. In such a state, at the above described step 46, it is determined that the content in the register SR1 is the logic one in all bits of the first to fifth bits and then at the following steps S75 to S80 the mole being visually displayed is visually displayed as if the same burrows into the ground. More specifically, at the step S75 the content in the register SR1 at that time is transferred to the accumulator ACC. At the step S76 the content in the accumulator ACC is shifted leftward, i.e. the logic zero is written in only the fifth bit. At the step S77 the content in the accumulator ACC and the content in the register SR1 are processed to evaluate the logical product thereof, which is stored in the accumulator ACC. At the step S78 the content in the accumulator ACC is transferred to the register SR1 and is stored therein. Then at the following step S79 the content in the register SR1 is read out and is applied to the decoder/driver 75, thereby to display the segments of the segment column 21 based on the content in the register SR1. Then at the step S80 it is determined whether the content in the register SR1 is all 0's, i.e. whether the display of all the segments of the segment column 21 has been extinguished, and the operation at the steps S75 to S80 is repeated until the content becomes all 0's. Thus, display is controlled such that the respective segments being displayed in the segment column 21 is extinguished one by one. When the logic zero is written in all the bits in the register SR1 and the display state of the respective segments of the segment column 21 are extinguished, the program then proceeds to the step S81. At the step S81, 1 is added to the count value in the counter CNT4, thereby to count the number of the hitting mistakes, and then the program return to the first step S9 of the game routine.

Meanwhile, as for the other segment columns 22 to 25, likewise the content in the register corresponding to the column where the hitting mistake occurred is shifted one bit by one bit. However, in the figure illustration of the flow of the processing operation for the segment columns 22 to 24 has been omitted.

By the above described operation, display of the respective segment columns is controlled and when the column being displayed and the display position of the hitting person figure coincide with each other, the hammer figure is visually displayed as if the same is swung down, whereas in the case where a hitting mistake occurs the displayed segments are in succession extinguished from the top one by one. While the above described operation is repeated, when a hitting mistake occurs three times, at the step S68 it is determined that the count value in the counter CNT4 is 3, thereby to terminate the game.

In terminating the game, at the step S82 the score point as counted in the counter CNT2 and the best score point as counted by the counter CNT3 are compared, and if the best score point attained in the prior games is larger than the score point attained by the present game, then at the step S83 the timer is operated. On the other hand, if it is determined at the step S82 that the score point attained at the present game is larger than the best score point, at the step S84 the content in the counter CNT3 is substituted for the content in the counter CNT2, thereby to renew the best score point, and then the program proceeds to the step S82. At the step S82 the timer is operated. After the lapse of a predetermined time period after the end of the game, the timer is timed up and at the step S85 the logic one is written in the first bit of the register SR1 and then the program returns to the above described step S3.

Meanwhile, in the embodiment shown, the current time renewal interrupting routine shown in FIG. 8A is executed each time the one minute clock $\phi m$ is inputted during the game or during the timepiece mode to be described subsequently, whereby the current time is renewed. More specifically, upon receipt of the one minute clock $\phi m$ from the clock generator 74, the central processing unit 71 advances by one the count value in the minute counter CNTm and at the step S87 it is determined whether the count value thereof is 60, i.e. 60 minutes. If the count value is not 60, then the above described operation is repeated upon each application of the one minute clock $\phi m$. Then, if and when it is determined at the step S87 that the count value in the minute counter CNTm is 60, then at the step S88 the count value in the hour counter CNTh is advanced by one, whereby the digit of "hour" is advanced by an hour. Then at the step S89 the minute counter CNTm is cleared and at the step S90 it is determined whether the count value in the hour counter CNTh is 12, i.e. 12 o'clock and if the count value is not 12, the program returns to the operation before the interrupting routine. On the other hand, when it is determined at the step S90 that the count value in the hour counter CNTh is 12, then at the step S91 the hour counter CNTh is cleared, whereby the program returns to the original operation.

If it is necessary to adjust the current time, the operation of the current time adjusting subroutine shown in FIG. 8B is executed. More specifically, if it is desired to adjust the current time, the reset switch 14 is depressed. Accordingly, at the step S1 in the main routine of FIG. 6 it is determined that the reset switch 14 is depressed, whereupon the program proceeds to the current time adjusting subroutine. In the current time adjusting subroutine, it is first determined at the step S92 whether the operating switch 131 has been depressed. If the said switch 131 has not been depressed, then at the step S93 the count value in the hour counter CNTh is advanced by 1. Thereafter, or if the switch 131 has not been depressed, then at the step S94 it is determined whether the operating switch 132 has been depressed. If the said switch 132 has been depressed, then at the step S95 the minute counter CNTm is advanced by 1. Thereafter, at the step S2 it is determined whether either the start switch 121 or 122 has been depressed, and if it is determined that neither the said switch 121 nor 122 has been depressed, the above described operation at the steps S92 to S95 is repeated until depression of the operating switch 131 or 132 is released.

Now description will be made of the operation in the case where the current time is displayed in the timepiece mode using the figures for use in a game. If and when it is determined at the step S3 that the start switch 121 has not been depressed and it is determined at step S5 that the start switch 122 has not been depressed, then the program proceeds to the timepiece display routine shown in FIG. 8C. In the timepiece display routine, first at the step S96 the current time information stored in the hour counter CNTh and the minute counter CNTm is read out and is applied to the decoder/driver 75, whereby the same is displayed by the numerical information display portion 200. Then at the step S97 the content stored in the registers SR1 and SR5 is read out and is applied to the decoder/driver 75, so that display of the segment column 21 or 25 at both ends is controlled based on the content in the register SR1 or SR5. In such a situation, a predetermined time period immediately after the end of one game, the segment 211 of the segment column 21 is displayed. At the step S98 it is determined whether the one second clock $\phi s$ is inputted and the operation at the steps S3, S4, and S96 to S98 is repeated until the one second clock $\phi s$ is inputted.

When the one second clock φs is inputted, then at the step S99 the hammer down flag FG2 is reset. Then at the step S100, it is determined whether the content in the register SR1 is larger than "11100", i.e. larger than the numerical value 7, and if it is determined that the same is not larger than the numerical value 7, then at the step S101 it is determined whether the content in the register SR5 is the numerical value 7 and, if it is determined that the same is not 7, the program proceeds to the step S102. At the step S102, the content of the counter CNT1 is preset to the numerical value 1, so that the middle segment 283 representing the hitting person figure is displayed. Then at the step S103 it is determined whether the content in the register SR5 is all 0's, and if the same is all 0's, then at the following steps S104 to S107 the same operation as that at the previously described steps S26 to S29 is performed, whereby the content in the register SR1 is changed to the content displaying the segment 212. Thereafter at the step S108 it is determined whether the content in the register SR1 is "11110", i.e. the code "0F", thereby to determine whether the segment 214 for the mole figure has been displayed. If it is determined at that time that the segment 214 has not been displayed, then the hitting person figure display routine is executed based on the content in the counter CNT1 and then the program returns to the step S3. While such operation is repeated, the segment column 21 is in succession visually displayed like the segments 211; 211 and 212; 211 to 213; and 211 to 214 upon each application of the one second clock φs. When it is determined at the step S100 that the content in the register SR1 is larger than the numerical value 7, i.e. the segment 214 has been displayed, then at the step S109 the content in the counter CNT1 is set to 0, whereby the data for displaying the hitting person figure at the left end is stored, whereupon the operation at the above described steps S103 to S107 is performed. When it is determined at the step S108 that the content in the register SR1 is the code "0F", then at the step S110 the content in the shift register SR1 is cleared, i.e. the shift register SR1 is loaded with all "0". Then at the step S111 the logic one is written in the first bit of the register SR5. After the hammer down flag FG2 is set at the step S112, the above described hitting person figure display routine is executed. Thus the segment column 21 is in succession displayed like the segments 211; 211 and 212; 211 to 213; and 211 to 214 per each second at the first to fourth seconds and at the fifth second timing the hammer is swung down.

During the following first to third second period the operation of the hitting person figure display routine is repeated at the steps S96 to S102, S103, and S113 to S117. At the fourth second timing the operation at the steps S96 to S101, S108, and S103 to S121 and the operation of the hitting person figure display routine are executed. Thus the segment column 25 is in succession visually displayed like the segments 251; 251 and 252; 251 to 253; and 251 to 254. Then at the fifth second timing display is made as if the hammer 275 is swung down through execution of the hitting person display routine. Likewise thereafter a mole hitting game is displayed using alternately the segment columns 21 and 25 at every five seconds, whereby the current time is visually displayed in terms of the second unit.

Thus, the current time is displayed by the numeral display portion 200, while the current time change in terms of second unit is visually displayed using the figure for use in the game, and as a result an advantage is brought about that through a look at the display even a user who does not know the kind of game of the apparatus can learn the content of the game. Furthermore, since the second is displayed in combination with the current time display using the figure for use in the game, other advantage is brought about that a pleasure of the game can also be enjoyed even in observing the current time.

Meanwhile, although the above described embodiment was described as embodied in a mole hitting game apparatus as one example of a figure display game apparatus, the moving targets of any other differently shaped animals may be used.

As described in the foregoing, according to the present invention, a figure display game apparatus which is capable of playing a game for hitting moving targets can be provided with compactness and an inexpensive cost. Thus, since the inventive figure display game apparatus is implemented in a small size, the apparatus is convenient to be portable and can provide a pleasure of playing freely a game anywhere.

Although the present invention has been described and illustrated in detail, it is clearly understood that the same is by way of illustration and example only and is not to be taken by way of limitation, the spirit and scope of the present invetion being limited only by the terms of the appended claims.

What is claimed is:

1. A figure displaying electronic game apparatus, comprising display means including at least a first symbol displaying region and a second symbol displaying region, said first symbol displaying region having a plurality of first kind symbol segments operable for display, said second symbol displaying region having a plurality of second kind symbol segments operable for display independently of said first kind symbol segments, operating means responsive to operation by a player for selecting at least one of said plurality of first kind symbol segments to be driven for display, first display driving means responsive to operation of said operating means for selectively driving for display said first kind symbol segments, display driving signal generating means for generating signals for driving for display said second kind symbol segments for automatically and sequentially changing the display state of said second kind symbol segments, second display driving means responsive to said display driving signals for driving for display automatically and sequentially at least one out of said plurality of second kind symbol segments, and display state determining means responsive to said display driving signals for said first and second kind symbol segments for determining that said display state of said first kind symbol segments contained in said first symbol displaying region and movable along a plurality of paths, at least one path intersecting said first direction line in which at least some of said first kind symbol segments are arranged, said apparatus further comprising game mode selecting means for selecting a first game mode for playing a game using all of the paths out of said plurality of paths of second kind symbol segments, and a second game mode for playing a game using a predetermined smaller number of paths of said plurality of paths of second kind symbol segments, and disabling means responsive to selection of said second game mode by said game mode selecting means for acting upon said second display driving means for disabling the driving for display of a predetermined number of paths of said plurality of paths of second kind symbols segments.

2. The game apparatus of claim 1, wherein said operating means comprises a first operating switch for changing the display position of said first kind symbol segments in said first direction along a first direction line in which at least some of said first kind symbol segments are arranged, and a second operation switch for changing the display portion of said first kind symbol segments in a second direction opposite to said first direction, and wherein said first display driving means comprises display driving means for driving for display said first kind symbol segments in said first direction in response to operation of said first operating switch and for driving for display said first kind symbol segments in said second opposite direction in response to operation of said second operation switch.

3. The game apparatus of claim 1, wherein said display state determining means comprises second determining means responsive to said first kind symbol segments corresponding to said disabled paths of the second kind symbol segments for determining that operation by a player of said operating means failed to establish the predetermined relation.

4. The game apparatus of claim 3, further comprising game state controlling means responsive to said determination by said display state determining means for controlling a game state, said game state controlling means comprising failure number counting means responsive to said second determining means for counting the number of failures, and wherein said display means comprises a failure number displaying region for displaying the number of failures counted by said failure number counting means.

5. The game apparatus of claim 4, wherein said first display driving means comprises means responsive to the counting by said failure number counting means of a predetermined number of failures allowed for one game for placing said apparatus into a disabled state.

6. The game apparatus of claim 4, wherein said game state controlling means comprises score point counting means responsive to determination of success by said display state determining means for counting a score point, and wherein said display means comprises a score point displaying region for displaying the count value by said score point counting means.

7. The game apparatus of claim 6, wherein said display driving signal generating means comprises periodical signal generating means for generating a periodical signal, and means responsive to said count value by said score point counting means for changing an occurrence period of the periodical signal by said periodical signal generating means.

8. The game apparatus of claim 1, wherein said display means comprises electrode driving type display means including segment electrodes, said electrode driving type display operatively arranged for selectively driving for display said segment electrodes, said first kind symbol segments and said second symbol segments constituting said segment electrodes.

9. The game apparatus of claim 1, wherein said plurality of first kind symbol segments are arranged along a plurality of first direction lines in said general first direction and wherein said plurality of second kind symbol segments comprises a plurality of segment paths respectively intersecting said first direction lines along which said first kind symbol segments are arranged.

10. The game apparatus of claim 9, wherein said plurality of paths of second kind symbol segments are arranged to intersect said first direction lines in which said first kind symbol segments are oriented at different angles.

11. The game of claim 1, wherein said second display driving means comprises means for driving for display sequentially said second kind symbol segments of at least one path out of said plurality of paths such that the same may approach the position intersecting said first direction line along which said first kind symbol segments are arranged.

12. The game apparatus of claim 1, wherein said display state determining means comprises first determining means for determining whether said first kind symbol segments corresponding to a selected path of the second kind symbol segments have been driven for display at the timing when said second kind symbol segments of said selected path would intersect apparently with said first direction line of first kind symbol segments.

13. The game apparatus of claim 12, wherein said display state determining means comprises second determining means for determining that operation by said operating means is successful based on said first kind symbol segments corresponding to said selected path of second kind symbol segments having been driven for display.

14. The game apparatus of claim 4, further comprising a game start switch for starting a game through operation thereof, and means responsive to operation of said game start switch for resetting the count value by said failure number counting means.

15. The game apparatus of claim 6, further comprising a game start switch for starting a game through operation thereof, and means responsive to operation of said game start switch for resetting the count value of said score point counting means.

16. The game apparatus of claim 1, further comprising game state controlling means responsive to said determination by said state determining means for controlling a game state.

* * * * *

UNITED STATES PATENT AND TRADEMARK OFFICE
CERTIFICATE OF CORRECTION

PATENT NO. : 4,415,153

DATED : November 15, 1983

INVENTOR(S) : Gunpei Yokoi

It is certified that error appears in the above-identified patent and that said Letters Patent is hereby corrected as shown below:

In the Cover Sheet, the listing of the number of Drawing Figures is wrong and should read: --16 Claims, 16 Drawing Figures--.

Claim 1, Column 22, line 45 "segements" should read: --segments--;

Column 22, line 55, after "and" the following should be inserted: --said display state of said second kind symbol segments contained in said second symbol displaying region are in a predetermined relation, wherein said plurality of first kind symbol segments are operatively oriented in a given general first direction, at least some of said first kind symbol segments being arranged along a first direction line, and wherein said plurality of second kind symbol segments are apparently--;

Column 23, line 2, "symbols" should read: --symbol--.

Claim 3, Column 23, line 19, "determ-" should read: --determin- --.

Signed and Sealed this

Thirty-first Day of January 1984

[SEAL]

Attest:

GERALD J. MOSSINGHOFF

Attesting Officer     Commissioner of Patents and Trademarks